(12) United States Patent
Nakano et al.

(10) Patent No.: US 10,579,487 B2
(45) Date of Patent: Mar. 3, 2020

(54) SEMICONDUCTOR DEVICE AND CONTROL METHOD THEREOF INCLUDING A PLURALITY OF PROCESSING UNITS

(71) Applicant: Renesas Electronics Corporation, Tokyo (JP)

(72) Inventors: Shunsuke Nakano, Tokyo (JP); Yoshitaka Taki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 186 days.

(21) Appl. No.: 15/612,277

(22) Filed: Jun. 2, 2017

(65) Prior Publication Data

US 2018/0046557 A1    Feb. 15, 2018

(30) Foreign Application Priority Data

Aug. 10, 2016   (JP) ................................. 2016-157656

(51) Int. Cl.
*G06F 11/00*       (2006.01)
*G06F 11/20*       (2006.01)

(52) U.S. Cl.
CPC ............ *G06F 11/203* (2013.01); *G06F 11/20* (2013.01); *G06F 2201/805* (2013.01)

(58) Field of Classification Search
CPC ...... G06F 11/20; G06F 11/202; G06F 11/203; G06F 11/2025; G06F 11/2028; G06F 11/2043; G06F 11/2046
See application file for complete search history.

(56) References Cited

U.S. PATENT DOCUMENTS

| | | | | |
|---|---|---|---|---|
| 5,918,229 A | * | 6/1999 | Davis | G06F 9/5016 711/147 |
| 8,296,602 B2 | | 10/2012 | Fukuda | |
| 2004/0221193 A1 | * | 11/2004 | Armstrong | G06F 11/2028 714/10 |
| 2013/0191831 A1 | * | 7/2013 | Goyal | G06F 9/46 718/100 |
| 2014/0149783 A1 | * | 5/2014 | Georgiev | G06F 11/0793 714/4.2 |
| 2015/0082082 A1 | * | 3/2015 | Hirano | G06F 11/0757 714/10 |

FOREIGN PATENT DOCUMENTS

JP         2007-011426 A         1/2007

* cited by examiner

*Primary Examiner* — Michael Maskulinski
(74) *Attorney, Agent, or Firm* — McDermott Will & Emery LLP

(57) ABSTRACT

A semiconductor device (1) includes a first processing unit (10-1), a second processing unit (10-2), a writing unit (12), a storage unit (14), and a processing control unit (20). The writing unit (12) writes first information related to processing of each of the first processing unit (10-1) and the second processing unit (10-2) into the storage unit (14). The processing control unit (20) controls the operations of the first processing unit (10-1) and the second processing unit (10-2). The processing control unit (20) performs control to stop the first processing unit (10-1) when an error occurs in the first processing unit (10-1). When it is determined that the second processing unit (10-2) where an error has not occurred is able to maintain execution of the first processing by using first information stored in the storage unit (14), the second processing unit (10-2) maintains execution of the first processing.

13 Claims, 31 Drawing Sheets

PACKET INFORMATION Ipk

| ITEM | ADDRESS | DATA | r/w INFORMATION Irw | ERROR FLAG Fe | PROCESSING UNIT STOP FLAG Fs |
|---|---|---|---|---|---|
| DETAILS | READ/WRITE ADDRESS | READ/WRITE DATA | read:0 write:1 | ERROR NOT OCCURING:0 ERROR OCCURING:1 | PROCESSING UNIT NOT STOP:0 PROCESSING UNIT STOP:1 |

Fig. 4

| PROCESSING UNIT #1 DEDICATED AREA START ADDRESS |
| --- |
| PROCESSING UNIT #1 DEDICATED AREA END ADDRESS |
| PROCESSING UNIT #1 SHARED AREA START ADDRESS |
| PROCESSING UNIT #1 SHARED AREA END ADDRESS |
| PROCESSING UNIT #2 DEDICATED AREA START ADDRESS |
| PROCESSING UNIT #2 DEDICATED AREA END ADDRESS |
| PROCESSING UNIT #2 SHARED AREA START ADDRESS |
| PROCESSING UNIT #2 SHARED AREA END ADDRESS |

Fig. 5

SEMICONDUCTOR DEVICE AND CONTROL METHOD THEREOF INCLUDING A PLURALITY OF PROCESSING UNITS

CROSS-REFERENCE TO RELATED APPLICATIONS

This application is based upon and claims the benefit of priority from Japanese patent application No. 2016-157656, filed on Aug. 10, 2016, the disclosure of which is incorporated herein in its entirety by reference.

BACKGROUND

The present invention relates to a semiconductor device and a control method thereof and, for example, relates to a semiconductor device that includes a plurality of processing units and a control method thereof.

In a recent trend, a plurality of processing units such as processors are placed in a single semiconductor device such as a microcomputer. Further, a mechanism in which, when an error occurs in a certain processing unit (a certain processing unit has failed) in such a structure including a plurality of processing units, a normal processing unit takes over a task that has been executed in the processing unit where the error has occurred (the failed processing unit) is proposed.

For example, Japanese Unexamined Patent Application Publication No. 2007-11426 discloses a processing device in which, even when one of a plurality of processing units becomes defective, processing of this processing unit is performed by another processing unit. The processing device according to the above literature includes a plurality of abnormality detection circuits which detect an abnormality of a plurality of processing units and generates an abnormality detection signal and an abnormality monitoring control unit which controls at least one normal processing unit in a normal state to perform an abnormality saving process. Further, the processing device according to the above literature includes a register to which a reset instruction is set by a normal processing unit and which outputs, to an abnormal processing unit, the reset instruction that has been set in order to reset the abnormal processing unit.

SUMMARY

In the technique disclosed in Japanese Unexamined Patent Application Publication No. 2007-11426, in the case where an abnormal processing unit reads or writes data during a period from when the abnormal processing unit becomes abnormal to when it is reset, there is a possibility that data to be referred to by a normal processing unit may be overwritten with abnormal data or this data may disappear. In other words, there is a possibility that processing of an abnormal processing unit may have an adverse effect on processing of a normal processing unit. In such a case, the technique disclosed in the above literature cannot detect the above problem. The same applies to the case where a normal processing unit continues processing that has been performed by itself after an abnormal processing unit becomes abnormal.

The other problems and novel features of the present invention will become apparent from the description of the specification and the accompanying drawings.

According to one embodiment, a semiconductor device includes a plurality of processing units, a processing control unit that controls operations of the processing units, a storage unit, and a writing unit that writes, to the storage unit, first information related to processing of each of the plurality of processing units, wherein when an error occurs in a first processing unit among the plurality of processing units, the processing control unit performs control to stop the first processing unit, and when an error occurs in the first processing unit and it is determined that a second processing unit among the plurality of processing units is able to maintain execution of first processing based on information stored in the storage unit, the second processing unit maintains execution of the first processing.

Further, according to one embodiment, a semiconductor device includes a plurality of processing units, a processing control unit that controls operations of the processing units, and a decoding unit that acquires second information related to processing performed in a first processing unit among the plurality of processing units from a bus connected to each of the plurality of processing units, and performs processing for the second information, wherein when an error occurs in the first processing unit, the processing control unit performs control to stop the first processing unit, when an error occurs in the first processing unit, the decoding unit determines whether a second processing unit among the plurality of processing units is able to maintain execution of first processing based on the second information acquired from a bus connected to the first processing unit, and when it is determined that the second processing unit is able to maintain execution of the first processing, the second processing unit maintains execution of the first processing.

Note that the implementation of the device according to the above-described embodiments as a method or a system, a program causing a computer to execute processing of this device or a part of this device, an imaging device equipped with this device and the like are also effective as aspects of the present invention.

According to the embodiments described above, even when an error occurs in one of a plurality of processing units, it is possible to continue to perform processing as a whole system.

BRIEF DESCRIPTION OF THE DRAWINGS

The above and other aspects, advantages and features will be more apparent from the following description of certain embodiments taken in conjunction with the accompanying drawings, in which:

FIG. 4 is a view showing an example of packet information stored in a trace RAM according to the first embodiment.

FIG. 5 is a view showing an example of address information of a dedicated area and a shared area of each processing unit according to the first embodiment.

DETAILED DESCRIPTION

Figure 1:
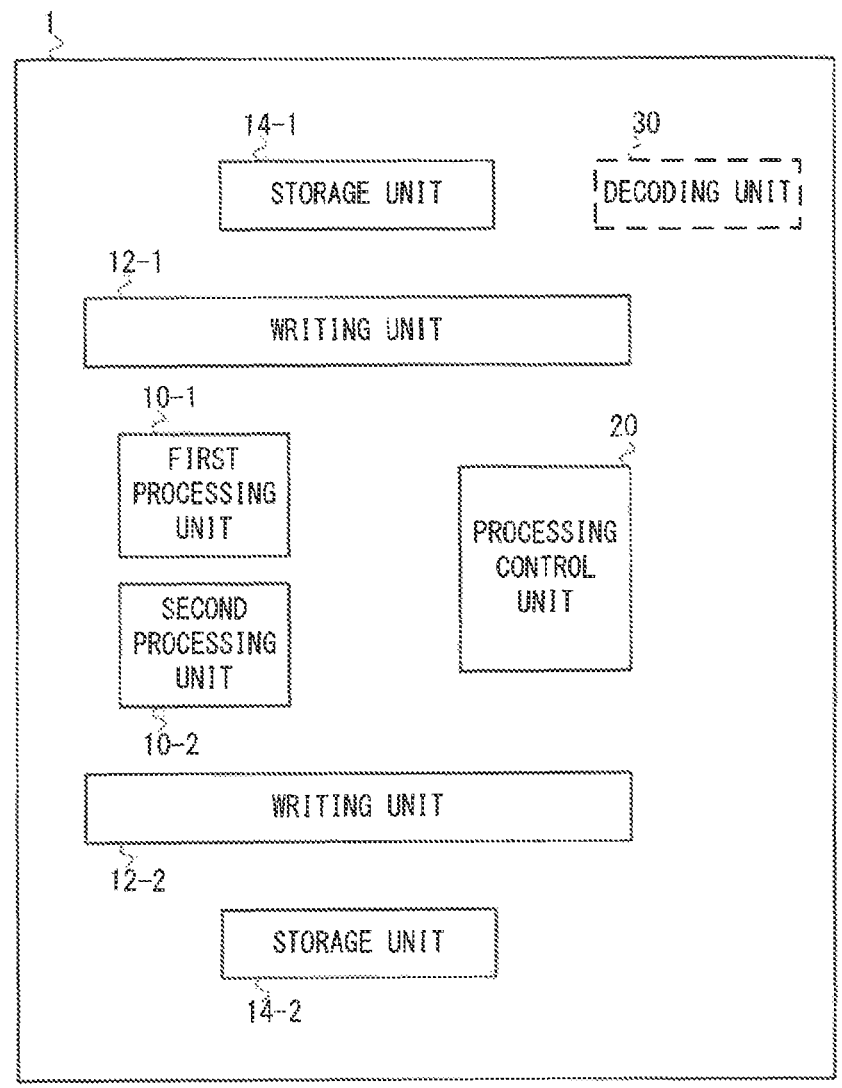
FIG. 1 is a view showing an overview of a semiconductor device according to this embodiment.

Hereinafter, embodiments will be described with reference to the accompanying drawings. The following description and the attached drawings are appropriately shortened and simplified to clarify the explanation. In the figures, the identical reference symbols denote identical structural elements and the redundant explanation thereof is omitted.

In the following embodiments, the description will be divided into a plurality of sections or embodiments when necessary for the sake of convenience. However, unless explicitly specified otherwise, those sections or embodiments are by no means unrelated to each other, but are in such a relation that one represents a modification, a detailed or supplementary description, etc. of part or whole of the other. Further, in the following embodiments, when a reference is made to the number etc, (including the number, numeric value, quantity, range, etc.) of elements, except in such cases where it is explicitly specified otherwise or the number is obviously limited to a specific number in principle, the number is not limited to the specific number but may be greater or less than the specific number.

It is needless to mention that, in the following embodiments, their constituent elements (including operation steps) are not necessarily essential, except in such cases where it is explicitly specified otherwise or they are obviously considered to be essential in principle. Likewise, in the following embodiments, when a reference is made to the shape, relative position, etc. of a constituent element or the like, this includes those shapes etc. substantially resembling or similar to that shape etc., except in such cases where it is explicitly specified otherwise or it is obviously considered otherwise in principle. The same applies to the number etc, (including the number, numeric value, quantity, range, etc.) mentioned above.

Further, elements that are shown as functional blocks for performing various kinds of processing in the drawings may be configured by a CPU (Central Processing Unit), a memory or another circuit as hardware or may be implemented by a program loaded to a memory or the like as software. It would be thus obvious to those skilled in the art that those functional blocks may be implemented in various forms such as hardware only, software only or a combination of those, and not limited to either one.

The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Overview of Embodiment

Prior to describing this embodiment, an overview of this embodiment is given hereinafter.

FIG. 1 is a view showing an overview of a semiconductor device 1 according to this embodiment. The semiconductor device 1 is a microcontroller, for example. The semiconductor device 1 includes a first processing unit 10-1 and a second processing unit 10-2, which are a plurality of processing units, a writing unit 12, a storage unit 14, and a processing control unit 20. Note that, although a plurality of writing units 12 (storage units 12-1 and 12-2) and a plurality of storage units 14 (storage units 14-1 and 14-2) are shown in FIG. 1, they may be replaced with a single writing unit 12 and a single storage unit 14, respectively.

The first processing unit 10-1 and the second processing unit 10-2 are processors such as CPU, for example. The first processing unit 10-1 and the second processing unit 10-2 perform predetermined information processing such as writing or reading. The number of processing units is not limited to two, and it may be three or more.

The storage unit 14 is a memory such as RAM, for example. The writing unit 12 writes information (first information) related to processing of each of the first processing unit 10-1 and the second processing unit 10-2 into the storage unit 14. The processing control unit 20 controls the operations of the first processing unit 10-1 and the second processing unit 10-2. Note that the semiconductor device 1 may include a decoding unit 30 that performs a determination process, which is described later. The operation of the semiconductor device 1 is described hereinbelow.

Figure 2:
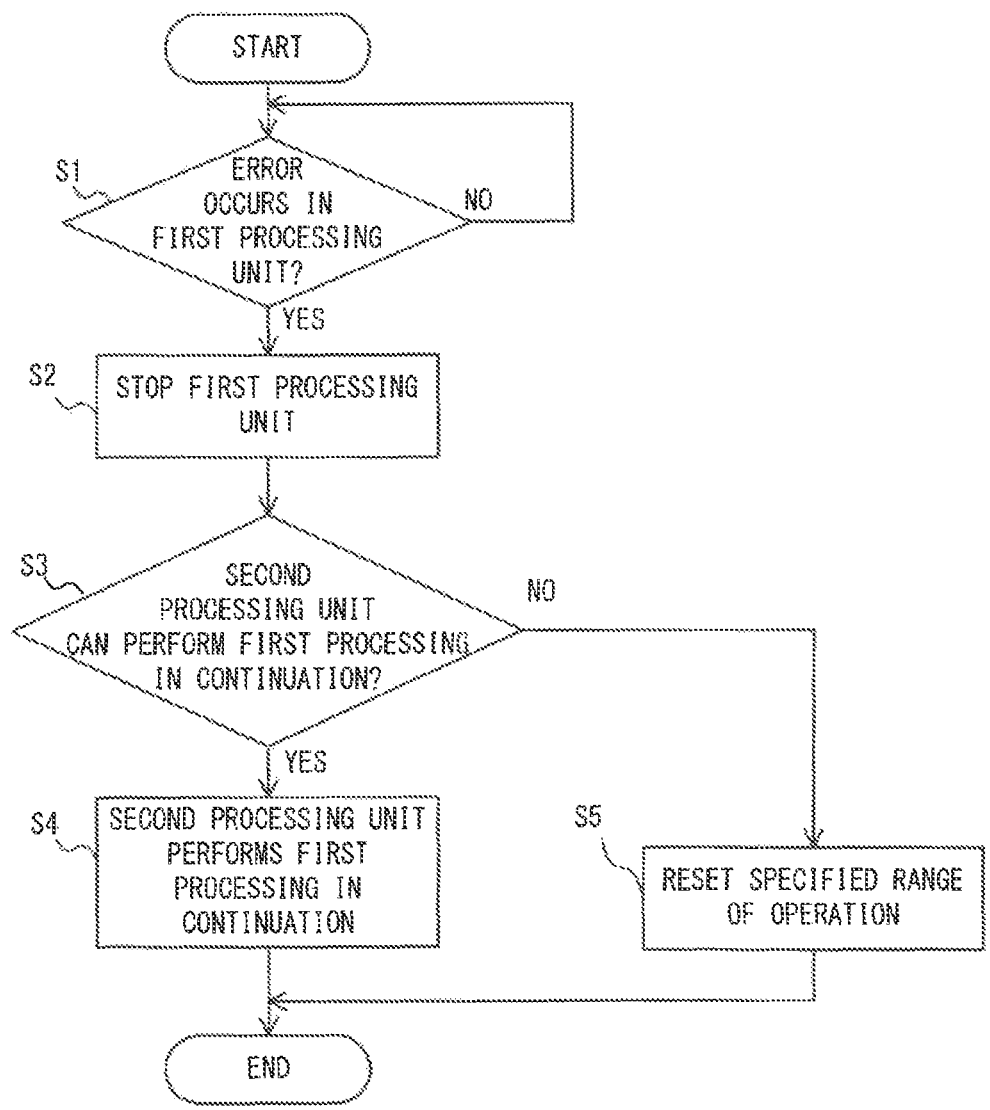
FIG. 2 is a view showing an overview of a control method of the semiconductor device according to this embodiment.

FIG. 2 is a view showing an overview of a control method of the semiconductor device according to this embodiment. Although FIG. 2 shows the case where an error occurs in the first processing unit 10-1, the same applies to the case where an error occurs in the second processing unit 10-2.

The processing control unit 20 determines whether an error occurs in the first processing unit 10-1 (Step S1), and when an error occurs in the first processing unit 10-1 (Yes in S1), the processing control unit 20 performs control to stop the first processing unit 10-1 (Step S2). The second processing unit 10-2 (or the decoding unit 30) determines whether the second processing unit 10-2 in which an error has not occurred is able to maintain execution of first processing (i.e., perform first processing continuously, whether it is the first processing unit 10-1 or the second processing unit 10-2 that has performed the first processing) or not by using first information that is stored in the storage unit 14 (step S3).

When it is determined that the second processing unit 10-2 is able to maintain execution of the first processing (Yes in S3), the second processing unit 10-2 maintain execution of the first processing (Step S4). On the other hand, when it is determined that the second processing unit 10-2 is unable to maintain execution of the first processing (No in S3), the processing control unit 20 performs processing to reset a specified range of operations in the semiconductor device 1 (Step S5). For example, the processing control unit 20 performs processing to reset the operation of the second processing unit 10-2.

The "first processing" may be processing that has been performed by the second processing unit 10-2 in which an error has not occurred or processing that has been performed by the first processing unit 10-1 in which an error has occurred. Specifically, when the "first processing" is processing that has been performed by the second processing unit 10-2, the second processing unit 10-2 continues the processing that has been performed by itself. On the other hand, when the "first processing" is processing that has been performed by the first processing unit 10-1, the second processing unit 10-2 takes over the first processing from the first processing unit 10-1 in which an error has occurred.

As described above, the semiconductor device 1 according to this embodiment is configured to determine whether or not a normal processing unit (the second processing unit 10-2) in which an error has not occurred is able to maintain (i.e., continue or take over) execution of the first processing by using information stored in the storage unit 14, and when it is able to maintain execution of the first processing, causes the normal processing unit to maintain execution of the first processing. Thus, even when an error occurs in one of a plurality of processing units, it is possible to continue to perform the processing as a whole system. Further, in the case where the normal processing unit is unable to maintain execution of the first processing, a specified range of operations (for example, the operation of the second processing unit 10-2) in the semiconductor device 1 is reset, thereby preventing the occurrence of a malfunction.

First Embodiment 1

A first embodiment is described hereinafter. In the embodiment described below, "a processing unit has failed" includes not only the case where an error occurs due to physical breakdown of a circuit in the processing unit but also case where an error occurs due to a temporary cause such as noise. Thus, in the embodiment described below, "a processing unit has failed" means that an error occurs in the processing unit. Likewise, "a failed processing unit" means a processing unit in which an error has occurred.

Figure 3:
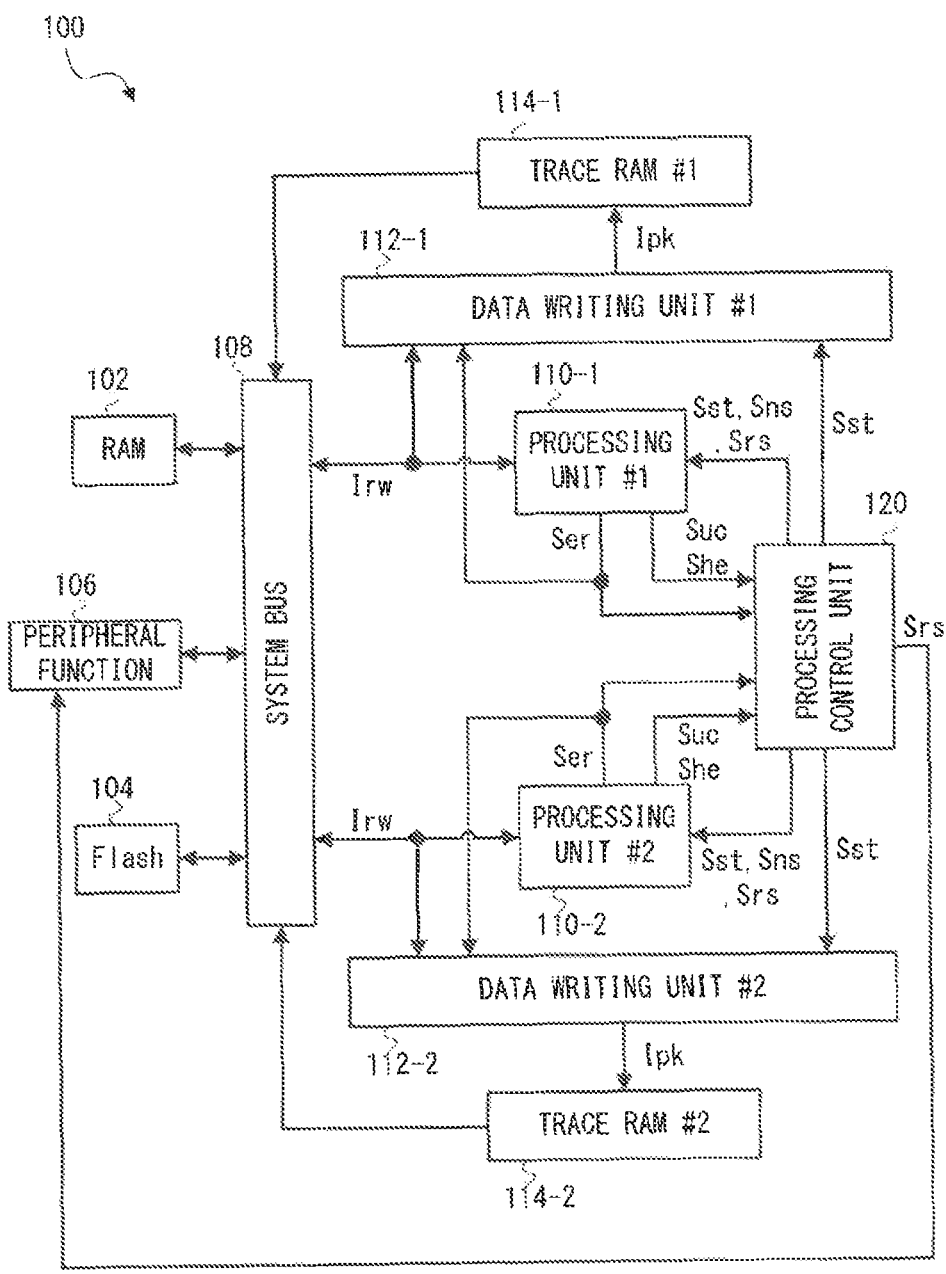
FIG. 3 is a view showing the configuration of a semiconductor device according to a first embodiment.

FIG. 3 is a view showing the configuration of a semiconductor device 100 according to a first embodiment. The semiconductor device 100 is, for example, a microcontroller (the same applies to other embodiments). The semiconductor device 100 includes a RAM 102, a flash memory 104, a peripheral function 106, and a system bus 108. Further, the semiconductor device 100 includes a processing unit 110-1 (processing unit #1), a processing unit 110-2 (processing unit #2), a data writing unit 112-1 (data writing unit #1), a data writing unit 112-2 (data writing unit #2), a trace RAM 114-1 (trace RAM #1), and a trace RAM 114-2 (trace RAM #2). Further, the semiconductor device 100 includes a processing control unit 120. Note that, when a plurality of elements such as processing units are described without distinguishing between them, they are collectively referred to as the processing unit 110, for example.

The processing unit 110-1 and the processing unit 110-2 are connected to the RAM 102, the flash memory 104, the peripheral function 106, the trace RAM 114-1 and the trace RAM 114-2 through the system bus 108. A signal from the processing unit 110-1 is input to the data writing unit 112-1 and the processing control unit 120. A signal from the processing unit 110-2 is input to the data writing unit 112-2 and the processing control unit 120. A signal from the processing control unit 120 is input to the processing unit 110-1, the processing unit 110-2, the data writing unit 112-1, the data writing unit 112-2 and the peripheral function 106. Signals from the data writing unit 112-1 and the data writing unit 112-2 are respectively input to the trace RAM 114-1 and the trace RAM 114-2.

Note that the processing unit 110-1 corresponds to the first processing unit 10-1 shown in FIG. 1 in some cases, and corresponds to the second processing unit 10-2 shown in FIG. 1 in other cases. Likewise, the processing unit 110-2 corresponds to the second processing unit 10-2 in some cases, and corresponds to the first processing unit 10-1 in other cases. Thus, among the processing unit 110-1 and the processing unit 110-2, the processing unit 110 in which an error has occurred corresponds to the processing unit 10-1, and the processing unit 110 in which an error has not occurred corresponds to the processing unit 10-2.

The RAM 102 is shared by the processing unit 110-1 and the processing unit 110-2, and it includes a dedicated memory area for each of the processing unit 110-1 and the processing unit 110-2 and a memory area shared by each of the processing units 110. The dedicated memory area for each of the processing unit 110-1 and the processing unit 110-2 stores special program codes for each of the processing unit 110-1 and the processing unit 110-2 and variables, constants or the like used in a program. The memory area that is shared by each of the processing units 110 is used for communications and the like such as transmission of the processing status of each of the processing unit 110-1 and the processing unit 110-2. Note that, although the RAM 102 is shared by the processing unit 110-1 and the processing unit 110-2 in FIG. 3, the RAM may be provided for each of the processing units separately.

The flash memory 104 is shared by the processing unit 110-1 and the processing unit 110-2, and it includes a dedicated memory area for each of the processing unit 110-1 and the processing unit 110-2 and a memory area shared by each of the processing units 110. The dedicated memory area for each of the processing unit 110-1 and the processing unit 110-2 stores special program codes for each of the processing unit 110-1 and the processing unit 110-2, constants or the like used in a program, and address information of the dedicated memory area and the shared memory area of each processing unit 110. The memory area that is shared by each of the processing units 110 stores program codes, constants and the like that are common to the processing unit 110-1 and the processing unit 110-2. Note that, although the flash memory 104 is shared by the processing unit 110-1 and the processing unit 110-2 in FIG. 3, the flash memory may be provided for each of the processing units separately.

The peripheral function 106 is composed of a timer, an AD converter and the like for implementing an application using a microcontroller. The peripheral function 106 has a register for indicating the operation setting of the peripheral function 106 and a flag, a function of making an interrupt notice to the processing unit 110 and the like. By performing processing such as writing and reading from the processing unit 110-1 and the processing unit 110-2 to the register of the peripheral function 106, various types of applications are implemented. Further, the peripheral function 106 receives a notice of a reset signal from the processing control unit 120. The peripheral function 106 includes a peripheral function that is dedicated to each of the processing unit 110-1 and the processing unit 110-2 and a peripheral function that is shared by the plurality of processing units 110.

The processing unit 110-1 and the processing unit 110-2 are processors such as, for example, CPUs. Each of the processing unit 110-1 and the processing unit 110-2 is composed of an ALU (Arithmetic Logic Unit), a control device, a register, a memory, a function of reading data from and writing data to the resister of the peripheral function 106 and the like. Each of the processing units 110 performs a process for an application, a continuation process, a handover process (i.e., taking-over process) and the like by using program codes stored in the flash memory 104 and the RAM 102 or the like.

Each of the processing units 110 has a mechanism that detects an error of the processing unit 110 itself. In one example, each of the processing units 110 includes a processing unit that serves as a master and a processing unit that monitors processing of the master, and detects an its own error in a lockstep fashion. The data writing unit 112-1 and the processing control unit 120 are notified of an error of the processing unit 110-1 that is detected in the processing unit 110-1 by an error signal Ser. The data writing unit 112-2 and the processing control unit 120 are notified of an error of the processing unit 110-2 that is detected in the processing unit 110-2 by an error signal Ser. Each processing unit 110 is notified of a processing unit stop completion signal Sst, a stop completion processing unit notice signal Sns, and a reset signal from the processing control unit 120. Each processing unit 110 issues (i.e., transmits) a continuation operation unable signal Suc and a handover effect (i.e., taking-over effect) presence/absence signal She to the processing control unit 120.

The trace RAM 114-1 and the trace RAM 114-2 (storage units) are memory areas that store trace information, such as bus information, error information of the processing unit 110, and processing unit stop completion information, written by the data writing unit 112-1 and the data writing unit 112-2, respectively. The trace RAM 114 is not limited to being a RAM, and it may be any storage device such as a FF (flip-flop) or a flash memory. Note that, one storage device (trace RAM 114) that stores the above-described written information may be provided for each processing unit 110, or one storage device may be shared by a plurality of processing units 110.

Further, although the trace RAM 114 and the system bus 108 are connected in the first embodiment, the trace RAM 114 and each processing unit 110 may be connected through a bus to which the data writing unit 112 is not connected. In this configuration, it is possible to avoid conflict with an access that is made from another processing unit 110 through the system bus 108. Further, when the processing unit 110 reads its own the trace RAM 114, the processing unit 110 can make access without storing the trace information in its own trace RAM 114.

The data writing unit 112-1 and the data writing unit 112-2 have mechanisms that write write/read information, error information and an operating state of the processing unit 110-1 and the processing unit 110-2, as packet information to the trace RAM 114-1 and the trace RAM 114-2, respectively. Further, the data writing unit 112 has write pointer information indicating an address at which the data writing unit 112 writes packet information in the trace RAM 114. The data writing unit 112 acquires bus information such as write/read information from a bus signal between each processing unit 110 and the system bus 108. The data writing unit 112 is notified of the error signal Ser of each processing unit 110 from each processing unit 110. The data writing unit 112 is notified of the processing unit stop completion signal Sst concerning each processing unit 110 from the processing control unit 120.

Note that, although one data writing unit 112 is provided for each processing unit 110 in the first embodiment, one data writing unit 112 may be shared by each of the processing units 110. Further, setting of the configuration or the like of information to be written to the trace RAM 114 may be stored as a fixed value by previously connecting the data writing unit 112 with the ground, power supply or the like or connecting it with a signal that is a logical fixed value. Note that a system where setting can be changed from the processing unit 110 may be configured by connecting the data writing unit 112 to which a register for setting the configuration or the like is added with the processing unit 110 through a bus.

The processing control unit 120 has a function of issuing the reset signal Srs for stopping the processing unit 110, a timer function for counting the time, a mechanism for resetting only a specified range of the system, a storage area for storing a normal/failed status of each processing unit 110, and a storage area for handover target processing unit setting. The handover (i.e., taking-over) target processing unit setting indicates which processing unit 110 is to take over processing when a certain processing unit 110 has failed. Further, the timer function is able to count a specified time. Note that, the area that stores a set value of the specified time and the handover target processing unit setting can store them as fixed values by previously connecting the processing control unit 120 with the ground, power supply or the like or connecting it with a signal that is a logical fixed value.

The error signal Ser, the continuation operation unable signal Suc and the handover effect presence/absence signal She are input to the processing control unit 120 from the processing unit 110. The processing control unit 120 outputs the processing unit stop completion signal Sst, the stop completion processing unit notice signal Sns and the reset signal Srs to the processing unit 110. Further, the processing control unit 120 outputs the processing unit stop completion signal Sst to the data writing unit 112. Furthermore, the processing control unit 120 outputs the reset signal Srs to the peripheral function 106.

When the processing control unit 120 outputs the reset signal Srs for stopping the processing unit 110, it also outputs the reset signal Srs to the peripheral function 106 that is dedicated to each processing unit 110. Setting as to whether or not to also input the reset signal to the peripheral function 106 and setting for resetting only a specified range of the system (a range to be reset etc.) can be stored as fixed values by previously connecting the processing control unit 120 with the ground, power supply or the like or connecting it with a signal that is a logical fixed value. Further, a system in which the above setting can be rewritten from the processing unit 110 may be configured by placing a register for setting and connecting the processing control unit 120 with the processing unit 110 through the system bus 108 or a dedicated bus. Furthermore, a storage area that stores a normal/failed status can be configured by a FF. Note that, although the reset signal Srs is used to stop the processing unit 110 in the first embodiment, a signal for stopping a supply clock or the like may be used to stop the processing unit 110

FIG. 4 is a view showing an example of packet information Ipk that is stored in the trace RAM 114 according to the first embodiment. The packet information Ipk can be set for each processing unit 110. The packet information Ipk can contain an address, data related to the address, r/w information (read/write information) Irw, an error flag Fe, and a processing unit stop flag Fs.

The "address" is a write address or a read address. The "data" is write data to be written to the write address, read address to be read from the read address, or an indefinite value. The r/w information Irw is set to "0" when the processing unit 110 performs read processing, and it is set to "1" when the processing unit 110 performs write processing. The error flag Fe is set to "0" when an error does not occur in the processing unit 110, and it is set to "1" when an error occurs in the processing unit 110. The processing unit stop flag Fs is set to "0" when the processing unit 110 does not stop, and it is set to "1" when the processing unit 110 stops.

The packet information Ipk in which the error flag Fe and the processing unit stop flag Fs are both set to "1" is denoted as "packet information ES". Further, the packet information Ipk in which the error flag Fe is set to "1" and the processing unit stop flag Fs is set to "0" is denoted as "packet information E".

Note that the order, value and the like of data in the packet information Ipk shown in FIG. 4 are just examples, and they can be modified to the most appropriate structure according to the system configuration. Further, in the case where one trace RAM 114 is shared by a plurality of the processing units 110, identification information that is unique to each of the processing units 110 may be contained in the packet information.

FIG. 5 is a view showing an example of address information of the dedicated areas and the shared areas of each processing unit 110 according to the first embodiment. In the first embodiment, the address information shown in FIG. 5 is stored in the flash memory 104 or the like. The address information shown in FIG. 5 contains, for each processing unit 110, the start address and the end address of the dedicated area and the start address and the end address of the shared area. Note that, although address information for the processing unit 110-1 (processing unit #1) and the processing unit 110-2 (processing unit #2) is shown in FIG. 5, when the number of the processing units 110 is three or more, the number of address information can increase as appropriate according to that number.

Figure 6:
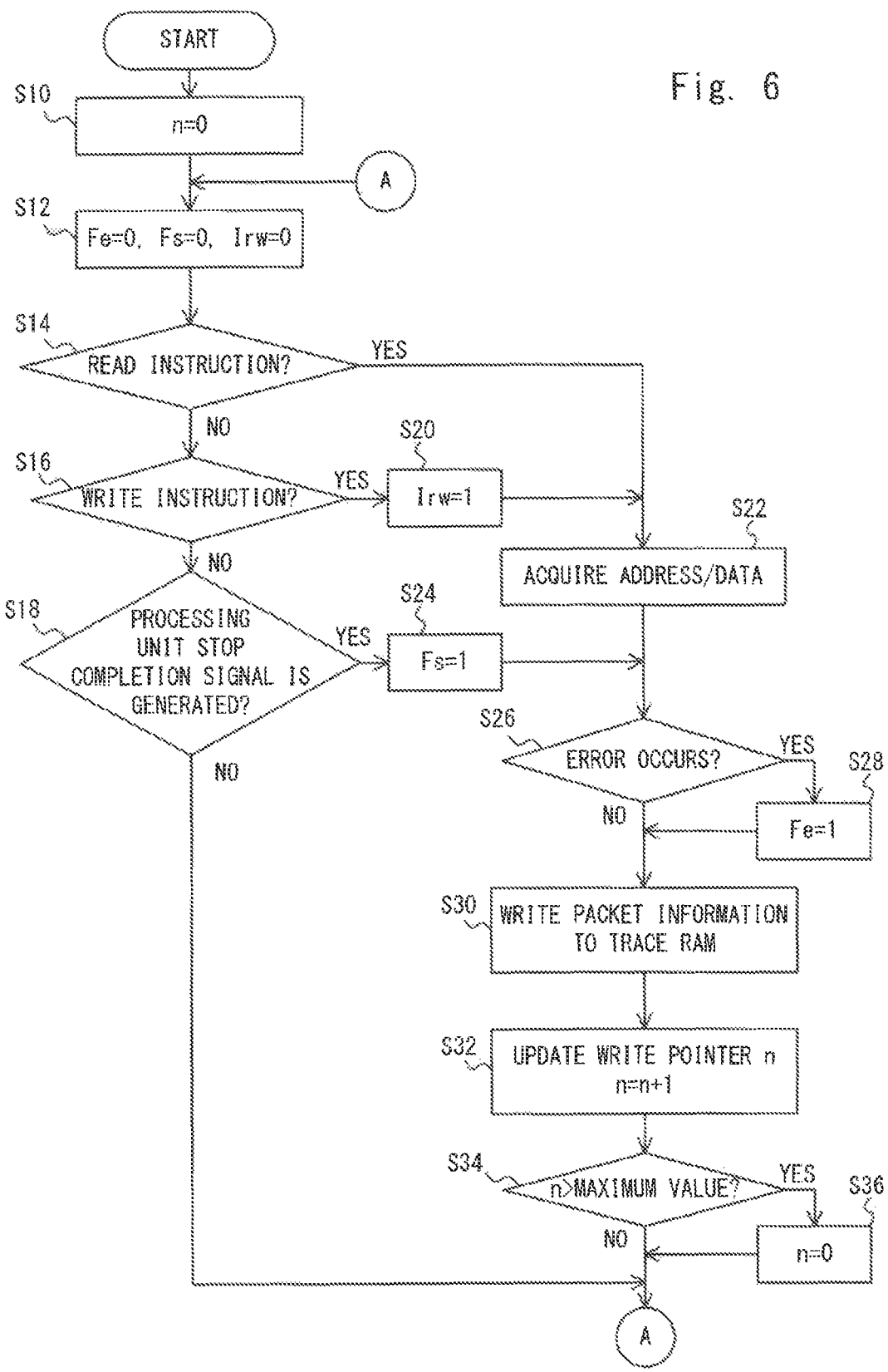
FIG. 6 is a view showing a process flow related to packet information of a data writing unit according to the first embodiment.

FIG. 6 is a view showing a process flow related to packet information of the data writing unit 112 according to the first embodiment. FIG. 6 shows, as an example of the operation of the data writing unit 112, processing in the case where a write pointer indicating the address to which the data writing unit 112 writes data in the trace RAM 114 is n, and the packet information shown in FIG. 4 is used.

First, the data writing unit 112 performs an initialization sequence (Step S10). To be specific, the data writing unit 112 sets the write pointer n to 0. Then, in the subsequent processing (S12 to S36), processing for writing each packet information (updating packet information) is performed for the write pointer n. Note that the processing of Step S10 may be performed independently of the subsequent processing (S12 to S36).

The data writing unit 112 sets each of the error flag Fe, the processing unit stop flag Fs and the r/w information Irw in the packet information Ipk to 0 (Step S12). Next, the data writing unit 112 determines whether a signal transmitted between the processing unit 110 and the system bus 108 indicates a read instruction or not (Step S14). When this signal does not indicate a read instruction (No in S14), the data writing unit 112 determines whether the signal transmitted between the processing unit 110 and the system bus 108 indicates a write instruction or not (Step S16). When this signal does not indicate a write instruction (No in S16), the data writing unit 112 determines whether the processing unit stop completion signal Sst is generated or not (Step S18). When the processing unit stop completion signal Sst is not generated (No in S18), it is determined that packet information (bus information, error information) has not been updated, and the process returns to Step S12.

When the signal transmitted between the processing unit 110 and the system bus 108 indicates a write instruction (Yes in S16), the data writing unit 112 sets the r/w information Irw in the packet information Ipk to "1" (Step S20), and the process proceeds to Step S22. On the other hand, when the signal transmitted between the processing unit 110 and the system bus 108 indicates a read instruction (Yes in S14), the data writing unit 112 keeps the r/w information Irw to "0", and the process proceeds to Step S22.

In Step S22, the data writing unit 112 acquires a read address or a write address of the processing unit 110 and data related to this address. Then, the process proceeds to Step S26. Note that, when the determination in Step S14 results in Yes, the address is a read address and the data is an indefinite value, and the read data may be acquired by capturing data at the point when read data is fixed based on a bus read cycle completion signal or the like. On the other hand, when the determination in S16 results in Yes, the address is a write address, and the data is write data. Further, when the processing unit stop completion signal Sst is generated (Yes in S18), the data writing unit 112 sets the processing unit stop flag Fs in the packet information Ipk to "1" (Step S24), and the process proceeds to Step S26.

The data writing unit 112 determines whether an error occurs in the processing unit 110 or not (Step S26). To be specific, the data writing unit 112 determines that an error occurs in the processing unit 110 when it receives the error signal Ser from the processing unit 110. When an error occurs in the processing unit 110 (Yes in S26), the data writing unit 112 sets the error flag Fe in the packet information Ipk to "1" (Step S28), and the process proceeds to Step S30. On the other hand, when an error does not occur in the processing unit 110 (No in S26), the data writing unit 112 performs processing in S30 without performing processing in S28. By setting the error flag Fe in this manner, it is possible to easily and reliably determine in which packet information an error has occurred in the determination process in FIGS. 8 and 9.

In Step S30, the data writing unit 112 writes the packet information Ipk into an area that is indicated by the write pointer n in the trace RAM 114 (Step S30). At this time, in the packet information Ipk, the r/w information Irw, the error flag Fe and the processing unit stop flag Fs are determined based on whether the process steps S20, S24 and S28 are done or not, respectively. Note that the packet size of the packet information Ipk that is written to the trace RAM 114 is determined by the number of bits of the packet information Ipk.

Next, the data writing unit 112 updates (increments) the write pointer n (Step S32). Then, the data writing unit 112 determines whether n exceeds the maximum value of the write pointer or not (Step S34). When n exceeds the maximum value of the write pointer (Yes in S34), the data writing unit 112 initializes the write pointer n (Step S36), and the process returns to Step S12. When, on the other hand, n does not exceed the maximum value of the write pointer (No in S34), the data writing unit 112 does not initialize the write pointer n and the process returns to Step S12.

Note that the timing of writing the packet information Ipk to the trace RAM 114 may be each time the packet information Ipk is updated, though not limited thereto. The data writing unit 112 may write the packet information Ipk to the trace RAM 114 at the timing when it is determined that writing or reading is done by the failed processing unit 110.

Note that, as long as at least a read address or a write address of reading or writing that is performed after an error occurs in the processing unit 110 (after the processing unit 110 has failed) can be found out by using the packet information Ipk, the packet information Ipk does not necessarily contain all of the information shown in FIG. 4. Thus, the packet information Ipk does not necessarily contain the read/write data, the r/w information Irw, the error flag Fe and the processing unit stop flag Fs. In this case, the data writing unit 112 can determine whether or not reading or writing by the failed processing unit 110 is performed after the occurrence of an error by, for example, writing the packet information Ipk after the error signal Ser is issued from the processing unit 110. Further, as for the r/w information Irw, the effect of reading by the failed processing unit 110 can be ignored when there is no mechanism like FIFO (First In, First Out), a mechanism having a read clear function or the like. Therefore, there is no need to store read data into the trace RAM 114 in this case, and the r/w information Irw is also not needed.

Figure 7:
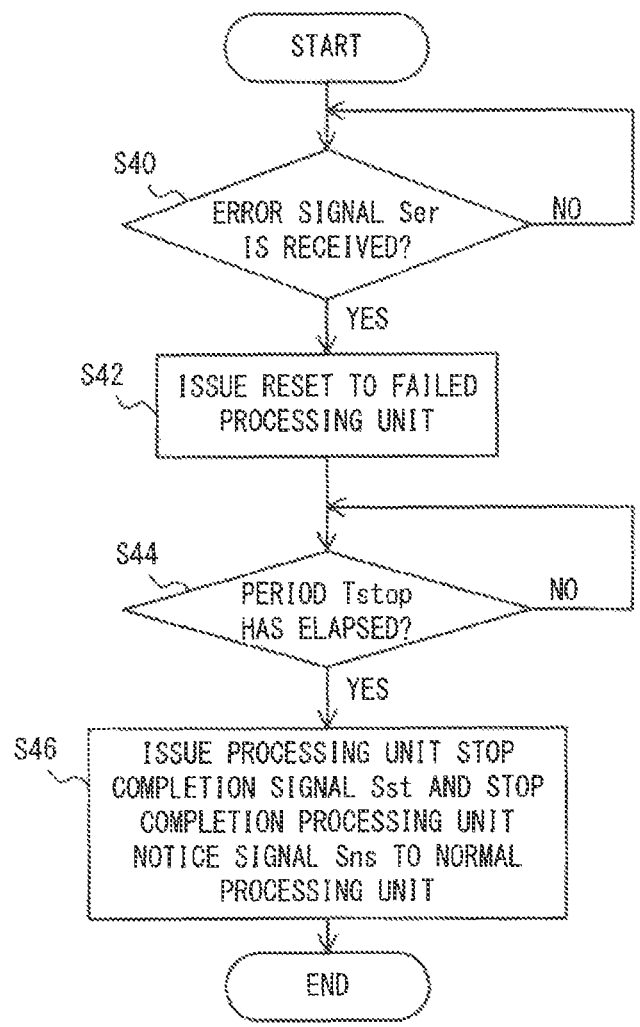
FIG. 7 is a flowchart showing a process when an error occurs in a processing unit which is performed by a processing control unit according to the first embodiment.

FIG. 7 is a flowchart showing a process when an error occurs in the processing unit 110, which is performed by the processing control unit 120 according to the first embodiment. When the processing control unit 120 receives the error signal Ser from the processing unit 110 (Yes in Step S40), it issues a reset signal Srs to the processing unit 110 that has transmitted the error signal Ser (i.e., the failed processing unit 110) (Step S42). The processing control unit 120 thereby performs control to stop the failed processing unit 110.

Then, the processing control unit 120 determines whether a period Tstop has elapsed from the issuance (i.e., transmission) of the reset signal Srs (Step S44). When the period Tstop has elapsed (Yes in Step S44), the processing control unit 120 issues the processing unit stop completion signal Sst and the stop completion processing unit notice signal Sns to the normal processing unit 110 (i.e., the non-failed processing unit 110) (Step S46). At this time, the processing control unit 120 also transmits the processing unit stop completion signal Sst to the data writing unit 112 corresponding to the failed processing unit 110.

The period Tstop indicates the maximum time needed to stop the entire processing unit 110 after the reset signal Srs is issued from the processing control unit 120 to the failed processing unit 110. In other words, when the period Tstop has elapsed after the reset signal Srs is issued from the processing control unit 120 to the failed processing unit 110, the entire failed processing unit 110 has stopped. The processing control unit 120 measures the period Tstop by starting a timer in the processing control unit 120 when it issues the reset signal Srs to the failed processing unit 110. Note that, to measure the period Tstop, a predetermined value is stored in the processing control unit 120. When this value and the count value of the timer become the same, the processing control unit 120 stops the count of the timer and initializes the count value. Then, the processing control unit 120 issues the stop completion processing unit notice signal Sns and 1-pulse processing unit stop completion signal Sst concerning the failed processing unit 110 at the same time to the normal processing unit 110.

The stop completion processing unit notice signal Sns is a signal indicating which processing unit 110 has completed stopping. Note that, there is no need to issue the stop completion processing unit notice signal Sns if the normal processing unit 110 can determine which processing unit 110 has completed stopping. For example, instead of issuing the stop completion processing unit notice signal Sns, a register for determination may be placed in the processing control unit 120, the processing unit 110 may be connected to the system bus 108 or a dedicated bus, and the processing control unit 120 may cause the normal processing unit 110 to access this register. Alternatively, the number of signal lines of the processing unit stop completion signal Sst same as the number of processing units 110 excluding the relevant processing unit 110 may be placed between the processing control unit 120 and the processing unit 110.

Figure 8:
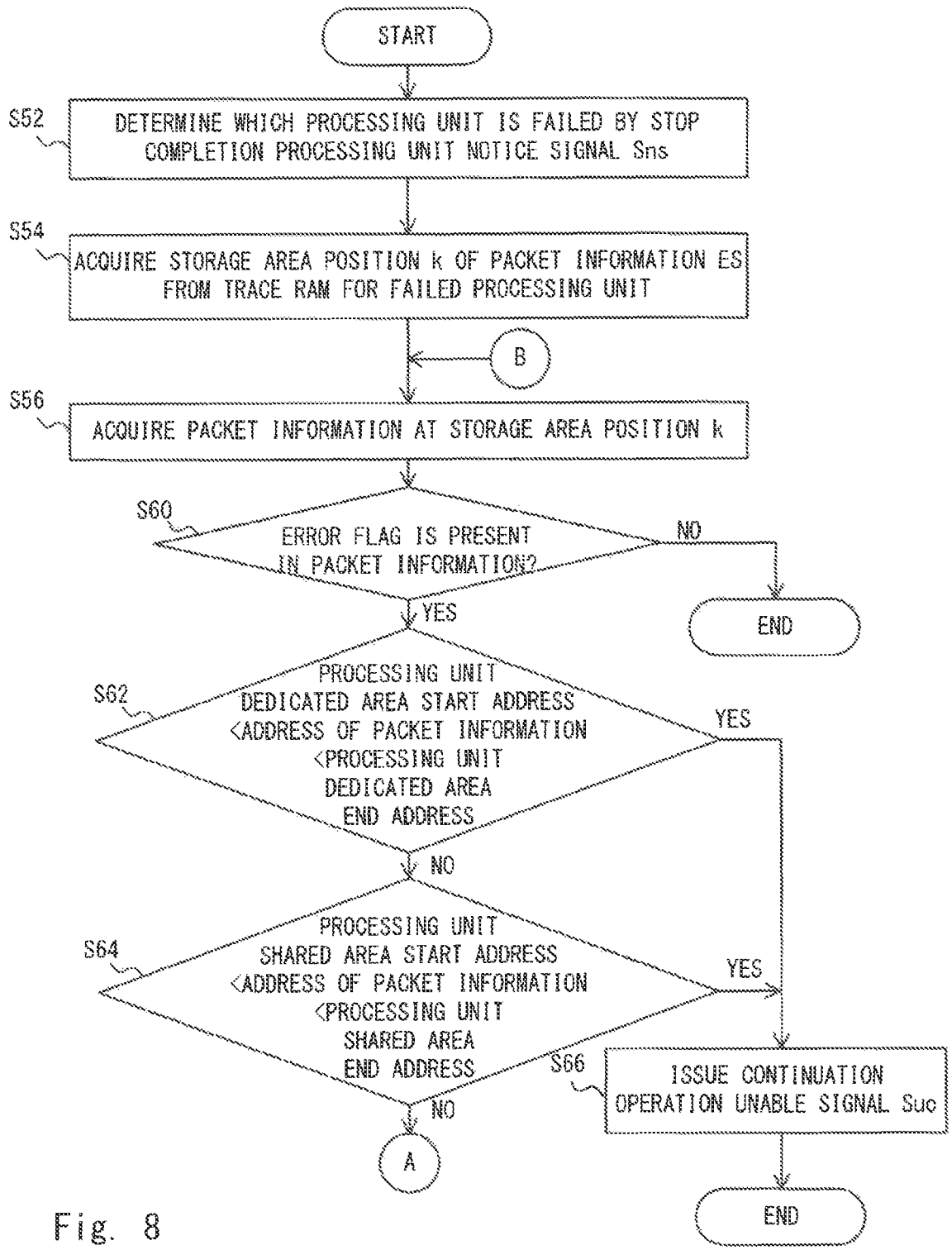
FIG. 8 is a view showing a process performed by a normal processing unit according to the first embodiment.
Figure 9:
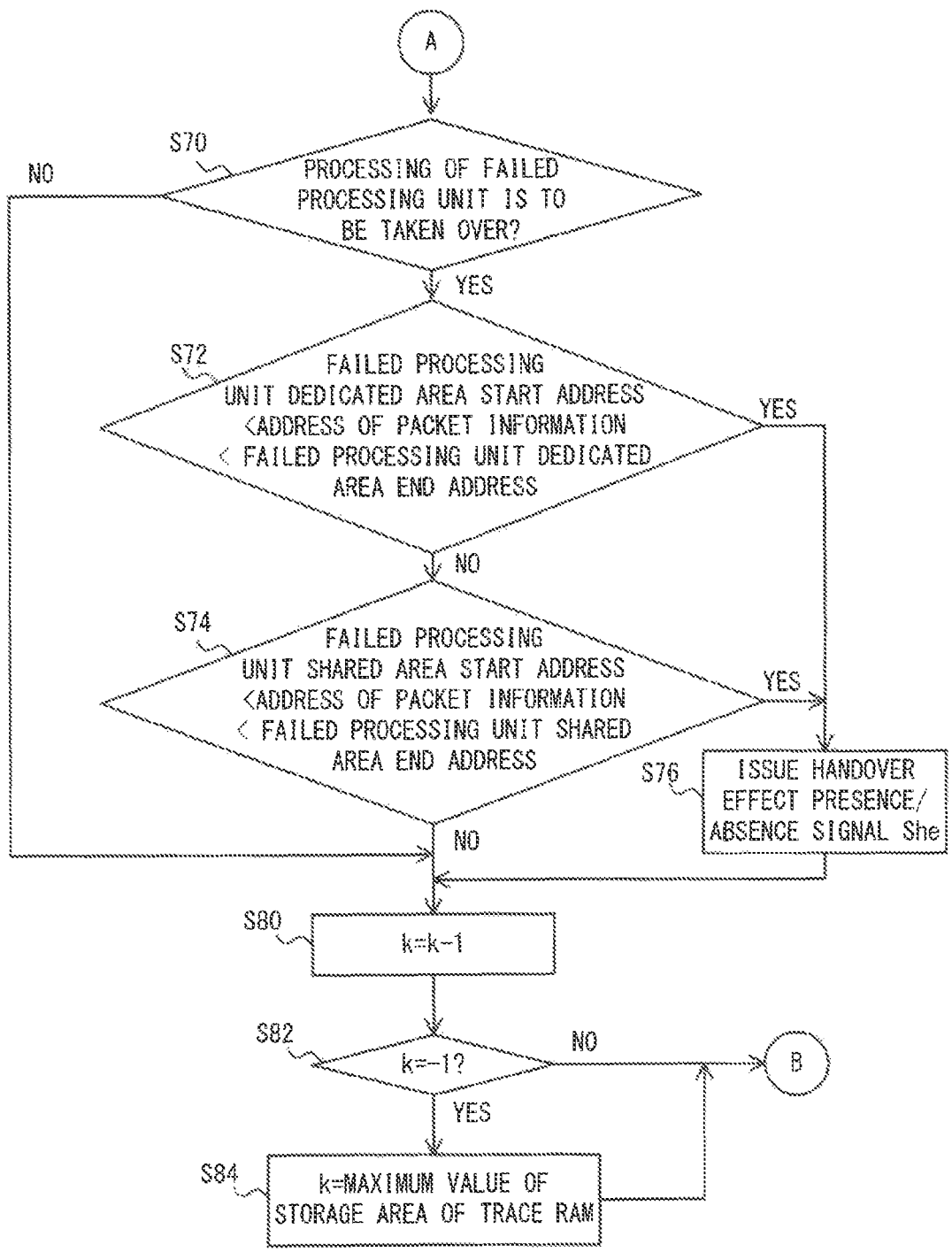
FIG. 9 is a view showing a process performed by a normal processing unit according to the first embodiment.

FIGS. 8 and 9 are views showing a process performed by the normal processing unit 110 according to the first embodiment. FIGS. 8 and 9 show continuation operation determination and handover determination (i.e., taking-over determination) after the normal processing unit 110 receives the processing unit stop completion signal Sst related to the failed processing unit 110. The "continuation operation determination" is to determine whether or not the normal processing unit 110 can continue the processing that has been performed by the normal processing unit 110 since before the failed processing unit 110 issues the error signal Ser. The "handover determination" is to determine whether or not the normal processing unit 110 can take over the processing that has been performed by the failed processing unit 110 before it issues the error signal Ser.

The normal processing unit 110 determines which processing unit 110 has failed by using the stop completion processing unit notice signal Sns (Step S52). The normal processing unit 110 acquires data required for continuation operation determination from the trace RAM 114 of the failed processing unit 110 (Steps S54 and S56) and, using this data, determines whether or not there is an effect on the processing of the normal processing unit 110 (Steps S60 to S64). When there is an effect (Yes in S62 or Yes in S64), the normal processing unit 110 outputs the continuation operation unable signal Suc in one pulse (Step S66).

To be specific, the normal processing unit 110 acquires (retrieves) a storage area position k of the packet information ES from the trace RAM 114 related to the failed processing unit 110 (Step S54). Then, the normal processing unit 110 acquires the packet information Ipk at the storage area position k (Step S56). Note that, although the packet information Ipk at the storage area position k is the packet information ES in the first processing in Step S56, the packet information Ipk at the storage area position k is packet information other than the packet information ES, such as the packet information E, in the second and subsequent processing in Step S56.

The normal processing unit 110 determines whether the error flag Fe in the packet information Ipk at the storage area position k is 1, that is, whether the error flag Fe is in the packet information Ipk at the storage area position k (Step S60). When there is no error flag Fe in the packet information Ipk at the storage area position k (No in S60), the normal processing unit 110 ends the processing.

When, on the other hand, the error flag Fe is in the packet information Ipk at the storage area position k (Yes in S60), the normal processing unit 110 determines whether the address of the packet information Ipk is between the processing unit dedicated area start address and the processing unit dedicated area end address of the normal processing unit 110 by referring to the address information shown in FIG. 5 (Step S62). In other words, the normal processing unit 110 determines whether the trace information stored in the area of the trace RAM 114 is within the range of the start and end address information of the dedicated memory area of the processing unit 110 itself.

When the trace information stored in the area of the trace RAM 114 is within the range of the start and end address information of the dedicated memory area of the normal processing unit 110 (Yes in Step S62), the process proceeds to Step S66. Otherwise (No in S62), the normal processing unit 110 determines whether the address of the packet information Ipk is between the processing unit shared area start address and the processing unit shared area end address of the normal processing unit 110 by referring to the address information shown in FIG. 5 (Step S64). In other words, the normal processing unit 110 determines whether the trace information stored in the area of the trace RAM 114 is within the range of the start and end address information of the shared memory area of the processing unit 110 itself.

When the trace information stored in the area of the trace RAM 114 is within the range of the start and end address information of the shared memory area of the normal processing unit 110 (Yes in Step S64), the process proceeds to Step S66. Otherwise (No in S64), the process proceeds to Step S70. In Step S66, the normal processing unit 110 issues the continuation operation unable signal Suc to the processing control unit 120.

In Step S70, the normal processing unit 110 determines whether or not to take over the processing that has been performed by the failed processing unit 110. This handover determination (i.e., taking-over determination) is made as appropriate according to the amount, importance or the like of processing that has been performed by the failed processing unit 110. Specifically, for example, when the amount of processing that has been performed by the failed processing unit 110 is more than a predetermined amount, or when the level of importance of processing that has been performed by the failed processing unit 110 is higher than a predetermined value, the normal processing unit 110 determines to take over the processing that has been performed by the failed processing unit 110.

When the normal processing unit 110 determines not to take over the processing that has been performed by the failed processing unit 110 (No in S70), the process proceeds to Step S80. On the other hand, when the normal processing unit 110 determines to take over the processing that has been performed by the failed processing unit 110 (Yes in S70), the normal processing unit 110 determines whether there is an effect of the handover on the processing of the failed processing unit 110 (S72 to S74). When there is an effect of the handover (Yes in S72 or Yes in S74), the normal processing unit 110 outputs the handover effect (i.e., taking-over effect) presence/absence signal She in one pulse (S76).

To be specific, the normal processing unit 110 determines whether the address of the packet information Ipk is between the processing unit dedicated area start address and the processing unit dedicated area end address of the failed processing unit 110 by referring to the address information shown in FIG. 5 (Step S72). In other words, the normal processing unit 110 determines whether the trace information stored in the area of the trace RAM 114 is within the range of the start and end address information of the dedicated memory area of the failed processing unit 110.

When the trace information stored in the area of the trace RAM 114 is within the range of the start and end address information of the dedicated memory area of the failed processing unit 110 (Yes in Step S72), the process proceeds to Step S76. Otherwise (No in S72), the normal processing unit 110 determines whether the address of the packet information Ipk is between the processing unit shared area start address and the processing unit shared area end address of the failed processing unit 110 by referring to the address information shown in FIG. 5 (Step S74). In other words, the normal processing unit 110 determines whether the trace information stored in the area of the trace RAM 114 is within the range of the start and end address information of the shared memory area of the failed processing unit 110.

When the trace information stored in the area of the trace RAM 114 is within the range of the start and end address information of the shared memory area of the failed processing unit 110 (Yes in Step S74), the process proceeds to Step S76. Otherwise (No in S74), the process proceeds to Step S80. In Step S76, the normal processing unit 110 issues the handover effect presence/absence signal She to the processing control unit 120. Note that checking as to whether there is an effect of taking-over (i.e., handover) in Steps S72 and S74 may be made only in regard to the area corresponding to the taking-over, not the whole of the dedicated and shared areas of the failed processing unit 110.

After that, the normal processing unit 110 decrements the value of the storage area position k of the packet information Ipk (Step S80). The normal processing unit 110 then determines whether the value of k is −1 or not (Step S82), and when not k=−1 (No in S82), the process returns to Step S56. On the other hand, when k=−1 (Yes in S82), the normal processing unit 110 sets the value of k to the maximum value of the storage area of the trace RAM 114 (Step S84), and the process returns to Step S56. Then, the process flow is repeated until the error flag Fe ceases to exist in the packet information Ipk that is stored at the storage area position k (S60). Specifically, the normal processing unit 110 makes the above-described determination for the packet information that contains the error flag Fe, in a reversed order from the storage area position k in which the packet information ES is stored. It is thereby possible to easily retrieve all of the packet information containing the error flag Fe, and it is thus possible to make the above-described determination more easily.

Figure 10:
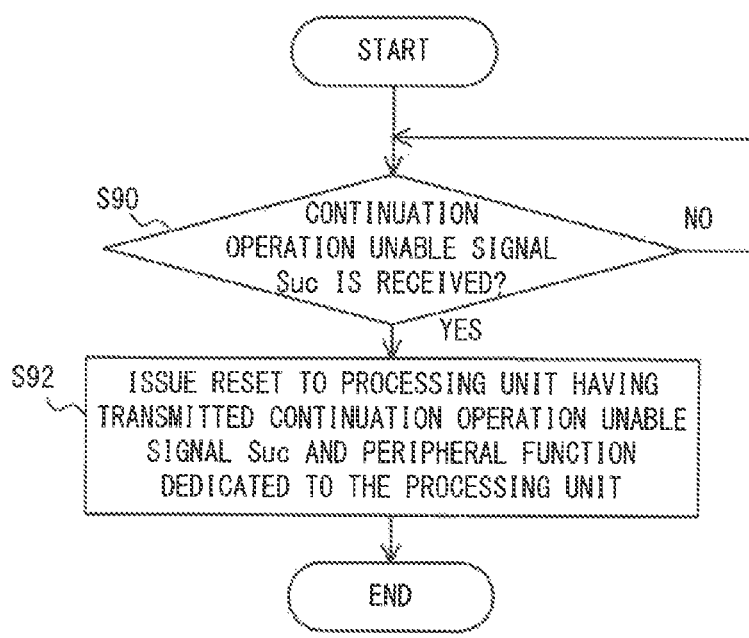
FIG. 10 is a flowchart showing an operation after receiving a continuation operation unable signal which is performed by the processing control unit according to the first embodiment.

FIG. 10 is a flowchart showing the operation after receiving the continuation operation unable signal Suc, which is performed by the processing control unit 120 according to the first embodiment. When the processing control unit 120 is notified of the continuation operation unable signal Suc from the normal processing unit 110 (Yes in Step S90), the processing control unit 120 issues a reset to the processing unit 110 that has notified it of the continuation operation unable signal Suc and the peripheral function 106 that is dedicated to this processing unit 110 (Step S92). The processing that may possibly be affected by the operation of the failed processing unit 110 is thereby prevented from being performed, and it is thus possible to prevent a malfunction of the normal processing unit 110. Note that the range for issuing a reset can be modified as appropriate according to setting in the processing control unit 120.

Figure 11:
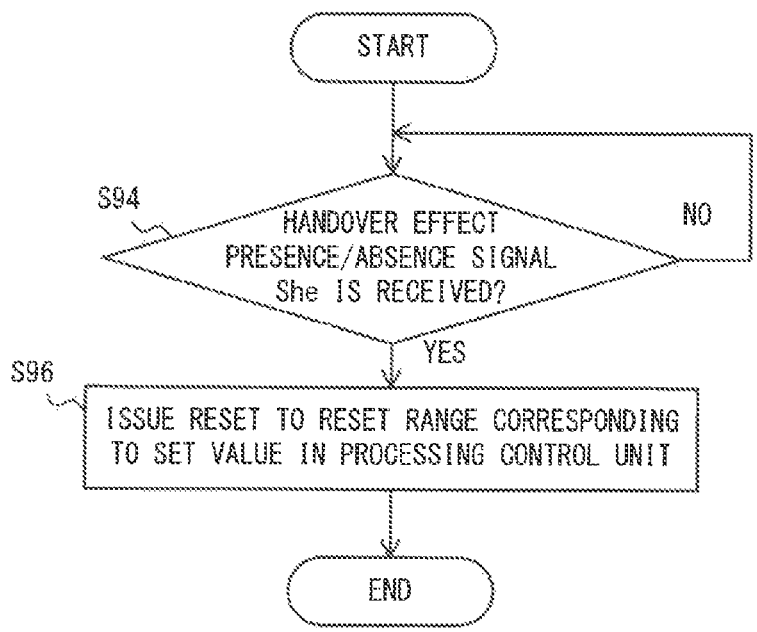
FIG. 11 is a flowchart showing an operation after receiving a handover effect presence/absence signal which is performed by the processing control unit according to the first embodiment.

FIG. 11 is a flowchart showing the operation after receiving the handover effect presence/absence signal She, which is performed by the processing control unit 120 according to the first embodiment. When the processing control unit 120 is notified of the handover effect presence/absence signal She from the normal processing unit 110 (Yes in Step S94), the processing control unit 120 issues a reset to a reset range corresponding to a set value in the processing control unit 120 (Step S96). The processing that may possibly be affected by the operation of the failed processing unit 110 is thereby prevented from being performed, and it is thus possible to prevent a malfunction which would otherwise be caused due to handover of the processing that has been performed by the failed processing unit 110 to the normal processing unit 110. Note that the range to issue a reset can be modified as appropriate according to a set value in the processing control unit 120.

Figure 12:
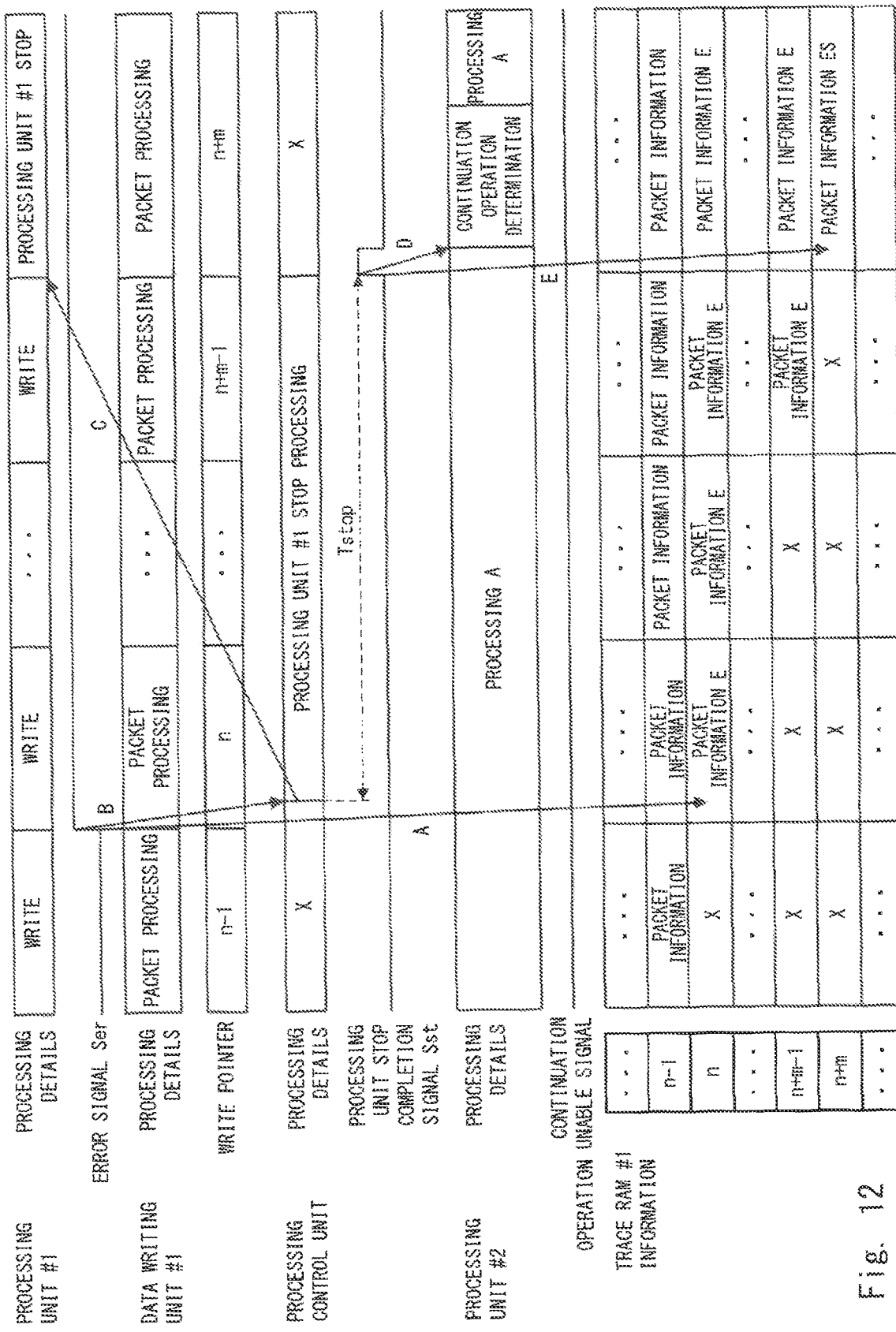
FIG. 12 is a timing chart showing an operation example according to the first embodiment.

FIG. 12 is a timing chart showing an operation example according to the first embodiment. FIG. 12 shows an example where the processing unit 110-2 (processing unit #2) makes continuation operation determination when an error occurs in the processing unit 110-1 (processing unit #1). Specifically, in FIG. 12, the "failed processing unit 110" is the processing unit 110-1 (processing unit #1), and the "normal processing unit 110" is the processing unit 110-2 (processing unit #2).

"Processing details" of the processing unit 110-1 indicate a read/write instruction that is issued by the processing unit 110-1 to the bus (system bus 108) and the status of the processing unit 110-1 itself. The error signal Ser is a signal that indicates the state where an error has not occurred (Low) in the initial state, and indicates the state where an error has occurred (High) at the timing when an error is detected by a lockstep mechanism or the like. In "packet processing" in "processing details" of the data writing unit 112-1 (data writing unit #1), the data writing unit 112-1 performs the packet processing flow as shown in FIG. 6. The write pointer indicates a value to be used for address information for writing to the trace RAM 114-1 (trace RAM #1) related to the data writing unit 112-1. Note that n is a value that is indicated by the write pointer in the trace RAM 114 at a certain time, and m indicates the number of times of writing/reading of the processing unit 110-1 after the processing unit 110-1 has failed.

In "Processing details" of the processing control unit 120, in "processing unit #1 stop processing", the processing control unit 120 performs the operation shown, for example, in FIG. 7. Further, "X" indicates that the processing control unit 120 performs another arbitrary processing or stops.

Further, "trace RAM #1 information" indicates information (trace information) that is stored in the trace RAM 114-1. In the trace RAM #1 information, "packet information" is the packet information Ipk without the error flag Fe (i.e., the error flag Fe is set to "0"). Further, as described above, "packet information E" is the packet information Ipk with the error flag Fe and without the processing unit stop flag Fs, and "packet information ES" is the packet information Ipk with the error flag Fe and with the processing unit stop flag Fs. Further, in the trace RAM #1 information, "X" indicates that arbitrary packet information is stored.

In the example of FIG. 12, an error occurs in the processing unit 110-1 at the timing corresponding to the write pointer n. Thus, as indicated by the arrow A, "packet information E" is stored in the area corresponding to the write pointer n in the trace RAM #1 information. Further, as indicated by the arrow B, when the error signal Ser is issued from the processing unit 110-1, the processing control unit 120 performs the processing unit #1 stop processing shown in FIG. 7. Then, as indicated by the arrow C, when the reset signal Srs is issued in the processing unit 110-1, which is the failed processing unit 110, the processing unit 110-1 does not stop immediately but instead stops at the timing of the write pointer n+m. On the other hand, when the period Tstop has elapsed from the issuance of the reset signal Srs, the processing control unit 120 issues the processing unit stop completion signal Sst to the processing unit 110-2, which is the normal processing unit 110, as indicated by the arrow D. At this time, as indicated by the arrow E, "packet information ES" is stored in the area corresponding to the write pointer n+m in the trace RAM #1 information. Note that "packet information E" is stored in the area corresponding to each of the write pointers n+1 to n+m−1 in the trace RAM #1 information.

When the processing unit 110-2 is notified of the processing unit stop completion signal Sst from the processing control unit 120, the processing unit 110-2 performs a continuation operation determination process. In the continuation operation determination process, the processing unit 110-2 acquires information between the packet information E and the packet information ES from the trace RAM #1 information (cf., S54, S56, S60 and S80 in FIGS. 8 and 9). Then, the processing unit 110-2 determines whether or not those acquired information affects the memory area that is shared by the processing unit 110-1 and the processing unit 110-2 and the memory area that is dedicated to the processing unit 110-2 (cf., S62, S64 in FIG. 8). Note that the case where it is possible to perform a continuation operation for the processing A is shown in the example of FIG. 12, and the processing unit 110-2 again performs the processing A that has been performed before the continuation operation determination after the continuation operation determination.

A method of acquiring information between the packet information E and the packet information ES is specifically described hereinafter. Because the packet information ES is stored in the area corresponding to the write pointer n+m in the example of FIG. 12, the processing unit 110-2 sets k=n+m in the processing of S54 and acquires the packet information ES in the processing of S56. Then, the processing unit 110-2 decrements k in the processing of S80 and thereby acquires the packet information E, in a reversed order from the area corresponding to the write pointer n at which the packet information E is first stored. Note that because there is no error flag Fe in the corresponding packet information when k=n−1 (No in S60), the process shown in FIG. 8 ends.

Note that, depending on the bus architecture, when a plurality of cycles are needed from a write/read instruction to write/read completion, it is necessary to control so as not to block the access of the failed processing unit 110 until the bus access ends. In the case of such an architecture, a sequencer that performs management until the access of the failed processing unit 110 is blocked when the failed processing unit 110 issues the error signal Ser and a status signal indicating the status of the processing unit 110 between the processing control unit 120 and the processing unit 110 can be added.

Figure 13:
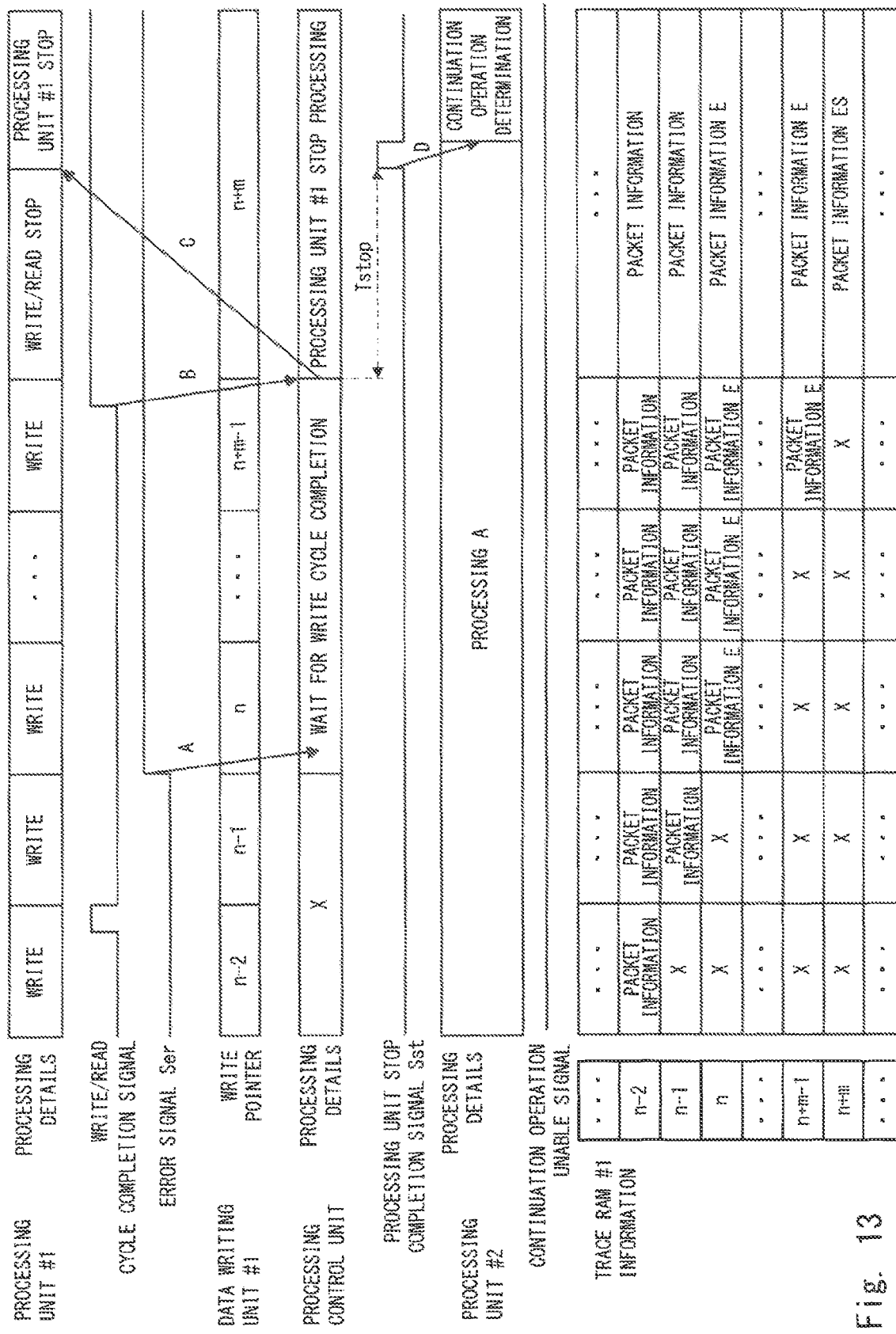
FIG. 13 is a timing chart where a status signal issued by a processing unit is added to the operation example of FIG. 12.

FIG. 13 is a timing chart where a status signal issued by the processing unit 110 is added to the operation example of FIG. 12. In the example of FIG. 13, a write/read cycle completion signal is used as the status signal. The write/read cycle completion signal indicates whether the processing unit 110 has completed writing/reading or the processing unit 110 is in the process of writing/reading.

In the case where the error signal Ser is issued by the processing unit 110-1, the processing control unit 120 waits until the write/read cycle (the write cycle in the example of FIG. 13) of the processing unit 110-1 is completed as indicated by the arrow A. Then, when the write/read cycle of the processing unit 110-1 is completed, the processing control unit 120 performs the processing unit #1 stop processing shown in FIG. 7 as indicated by the arrow B. Then, when the reset signal Srs is issued to the processing unit 110-1, which is the failed processing unit 110, as indicated by the arrow C, the processing unit 110-1 does not stop immediately but stops within the period Tstop. On the other hand, when the period Tstop has elapsed after the issuance of the reset signal Srs, the processing control unit 120 issues the processing unit stop completion signal Sst to the processing unit 110-2, which is the normal processing unit 110, as indicated by the arrow D. At this time, "packet information ES" is stored in the area corresponding to the write pointer n+m in the trace RAM #1 information. Note that "packet information E" is stored in the area corresponding to each of the write pointers n to n+m−1 in the trace RAM #1 information. The processing of the processing unit 110-2 is substantially the same as that in the example of FIG. 12.

Modified Example 1 of First Embodiment

Although the case where the number of processing units 110 is two is described in the first embodiment, the number of processing units 110 may be three or more. In this case, taking the case where a failure occurs in a plurality of processing units 110 into consideration, there is a possibility that the handover target processing unit 110 may fail. The handover target processing unit 110 is a processing unit 110 that is set in advance to take over the processing that has been performed by the failed processing unit 110.

Figure 14:
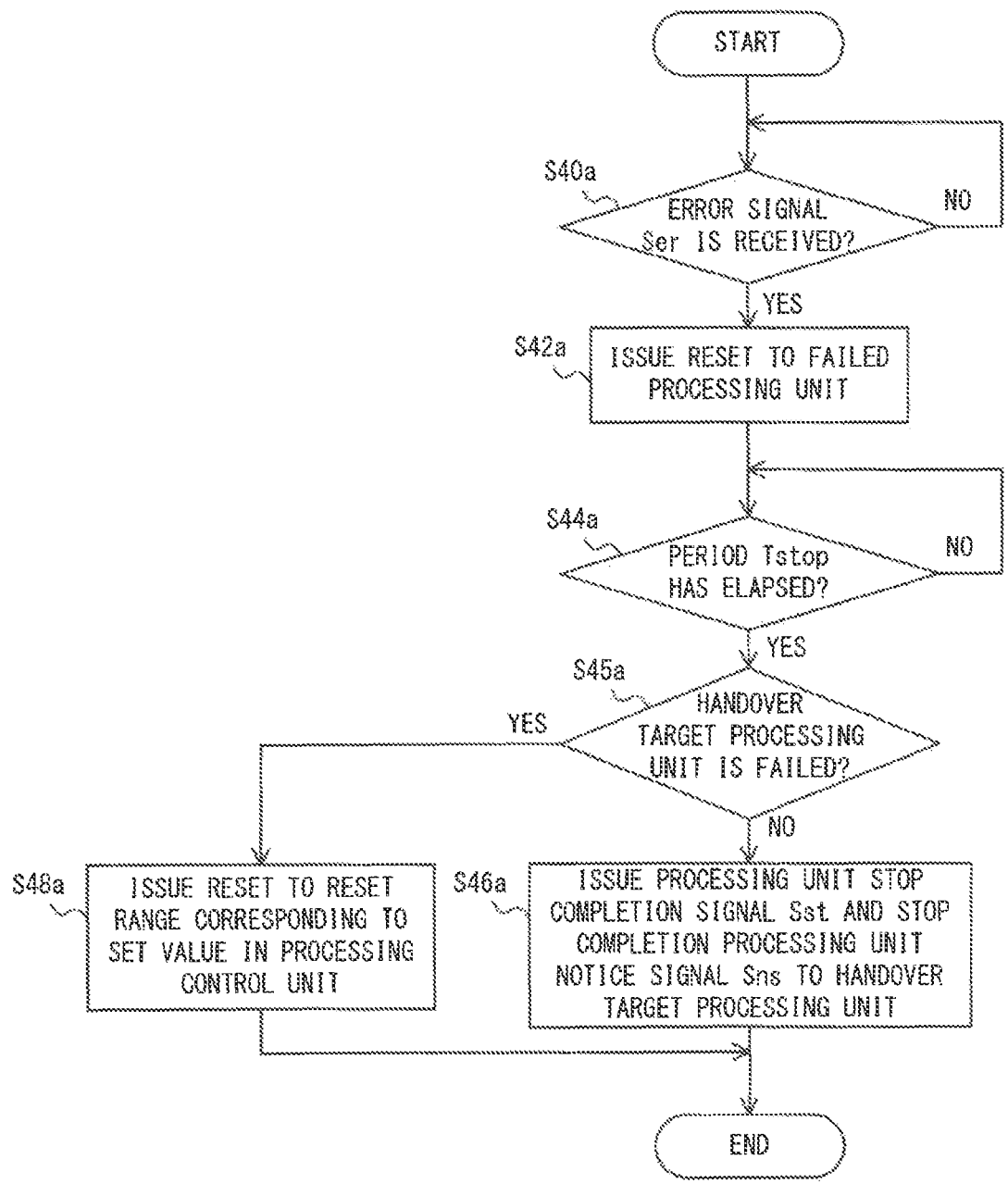
FIG. 14 is a flowchart of a process where failure determination on a handover target processing unit is added to the process shown in FIG. 7, according to a modified example 1 of the first embodiment.

FIG. 14 is a flowchart of a process where failure determination on the handover target processing unit 110 is added to the process shown in FIG. 7, according to the modified example 1 of the first embodiment. Steps S40a to S44a in FIG. 14 are substantially the same as S40 to S44 in FIG. 7, and thus not redundantly described.

The processing control unit 120 determines whether the handover target processing unit 110 has failed or not (Step S45a). To be specific, the processing control unit 120 determines the handover target processing unit 110 based on handover target setting in the processing control unit 120. Then, the processing control unit 120 determines whether it has received the error signal Ser from the handover target processing unit 110, and when it determines that it has received the error signal Ser, it determines that the handover target processing unit 110 has failed. To be more specific, the processing control unit 120 determines whether the handover target processing unit 110 has failed or not based on the value of FF that stores a normal/failed status in the processing control unit 120. The initial value of the FF is in the cleared state. The FF is set when an error in the processing unit 110 is reported, and it is cleared when the reset signal Srs to the failed processing unit 110 is stopped.

When it is determined that the handover target processing unit 110 has not failed (No in S45a), the processing control unit 120 issues the processing unit stop completion signal Sst and the stop completion processing unit notice signal Sns to the handover target processing unit 110, just like in S46 of FIG. 7 (Step S46a). The handover target processing unit 110 can thereby perform handover processing (i.e., taking over processing). On the other hand, when it is determined that the handover target processing unit 110 has failed (Yes in S45a), the processing control unit 120 issues a reset to a reset range corresponding to a set value in the processing control unit 120 (Step S48a). It is thereby possible to prevent a malfunction as the whole system even when the handover target processing unit 110 has failed. Further, by determining whether the handover target processing unit 110 has failed or not, it is possible to take over (i.e., hand over) the processing that has been performed by the failed processing unit 110 as the whole system without an error.

Modified Example 2 of First Embodiment

In the above-described first embodiment, an example in which, after the processing unit 110 has failed, the processing control unit 120 issues the reset signal Srs to the failed processing unit 110 and continues to stop the failed processing unit 110 is described. However, in the case where a failure occurs due to a temporary cause or the like, the issuance of the reset signal Srs to the failed processing unit 110 may be stopped to rerun the failed processing unit 110.

Figure 15:
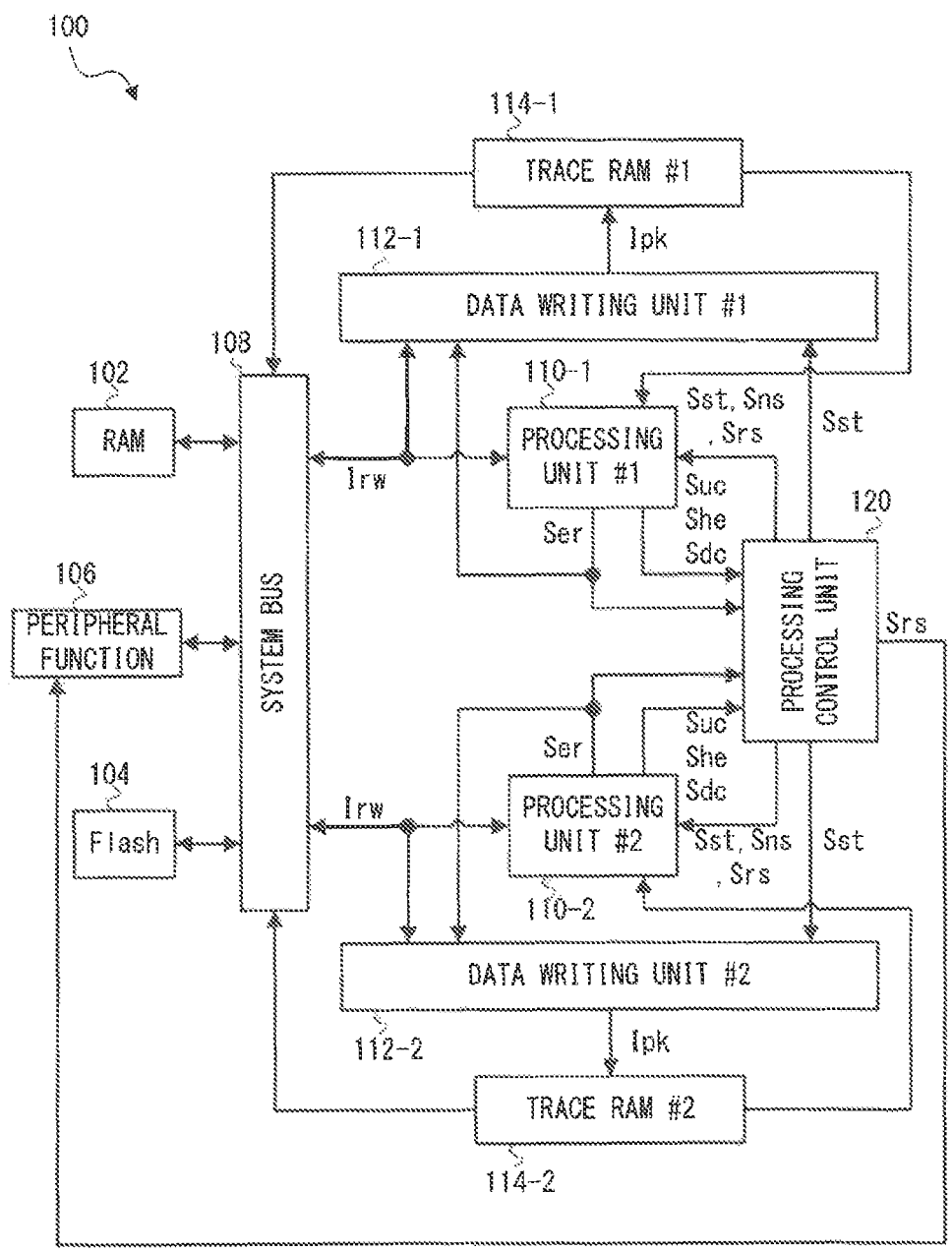
FIG. 15 is a view showing the configuration of a semiconductor device according to a modified example 2 of the first embodiment.

FIG. 15 is a view showing the configuration of the semiconductor device 100 according to a modified example 2 of the first embodiment. The semiconductor device 100 shown in FIG. 15 is different from the semiconductor device 100 shown in FIG. 3 in that a continuation operation determination completion signal Sdc is added thereto, and the trace RAM 114 and the processing unit 110 are connected through a dedicated system bus.

Each processing unit 110 writes information that is needed for each processing unit 110 to rerun into a memory area which is specified for each processing unit 110 in a storage device such as RAM. Note that setting whether or not to carry out rerun can be stored as a fixed value by previously connecting the storage device with the ground, power supply or the like or connecting it with a signal that is a logical fixed value.

Figure 16:
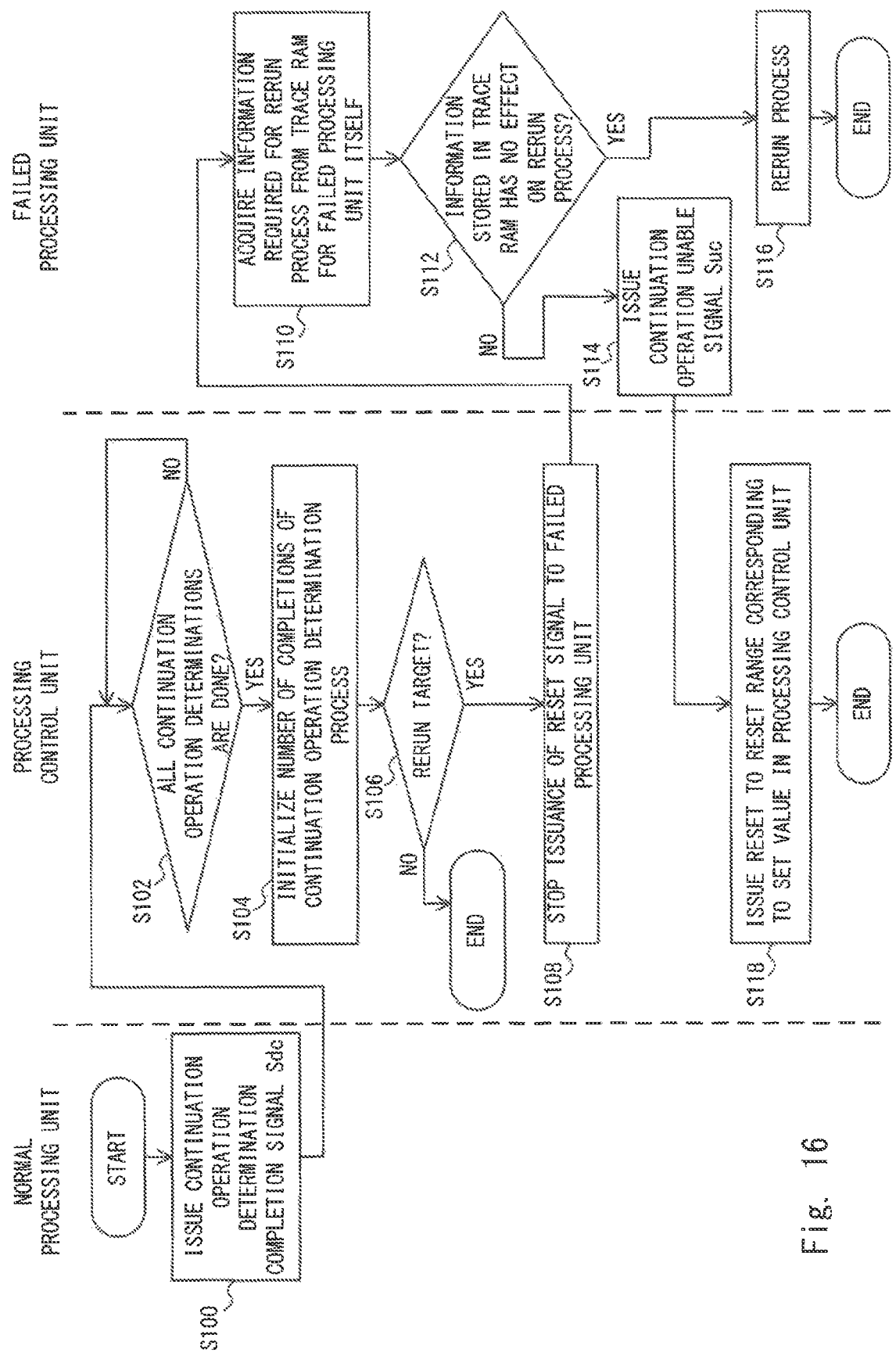
FIG. 16 is a flowchart showing a rerun process according to a modified example 2 of the first embodiment.

FIG. 16 is a flowchart showing a rerun process according to the modified example 2 of the first embodiment. After the continuation operation determination process, the normal processing unit 110 issues the continuation operation determination completion signal Sdc in one pulse to the processing control unit 120 in order to send notification of the completion of the continuation operation determination process (Step S100). The processing control unit 120 compares the number of normal processing units 110 with the number of processing units 110 for which the continuation operation determination process is done and thereby determines whether the continuation operation determination of all the processing units 110 is completed or not (Step S102).

After the continuation operation determination of all the processing units 110 is completed (Yes in S102), the processing control unit 120 initializes the number of completions of the continuation operation determination process (Step S104). After the processing of S104, the processing control unit 120 determines whether the failed processing unit 110 should be rerun (hereinafter, called "a rerun target") or not (Step S106). The determination as to whether the failed processing unit 110 is a rerun target or not may be made by pre-storing a setting indicating whether each processing unit 110 (or processing that has been performed by the processing unit 110) is a rerun target or not into a storage area that is accessible from the processing control unit 120 and using this setting. When the failed processing unit 110 is not a rerun target (No in Step S106), the process ends. On the other hand, when the failed processing unit 110 is a rerun target (Yes in Step S106), the processing control unit 120 stops the issuance of the reset signal Srs to the failed processing unit 110 (Step S108). The processing control unit 120 then performs control to rerun the failed processing unit 110.

When the failed processing unit 110 is about to rerun, the failed processing unit 110 performs substantially the same processing as the processing of S54 to S66 in FIG. 8 in order to determine whether the processing that has been performed after the occurrence of a failure has an effect on the processing of the failed processing unit 110 itself (S110 to S114). Specifically, the failed processing unit 110 acquires information required for the rerun process from the trace RAM 114 corresponding to the failed processing unit 110 itself (Step S110; corresponding to S54 to S56). Then, the failed processing unit 110 determines whether the information stored in the trace RAM 114 has an effect on the rerun process (Step S112; corresponding to S60 to S64).

When there is an effect on the rerun process (No in S112), the failed processing unit 110 issues the continuation operation unable signal Suc to the processing control unit 120 (Step S114; corresponding to S66). On the other hand, when there is no effect on the rerun process (Yes in S112), the failed processing unit 110 performs the rerun process (Step S116). The processing control unit 120 that has received the continuation operation unable signal Suc issues a reset to a reset range corresponding to a set value in the processing control unit 120 (Step S118). In this case, the processing control unit 120 may issue a reset to the processing unit 110 that has transmitted the continuation operation unable signal Suc and the peripheral function 106 that is dedicated to this processing unit 110. Further, the reset range may be modified by using a setting in the processing control unit 120.

In this manner, in the modified example 2 of the first embodiment, the processing control unit 120 performs control to rerun the failed processing unit 110. The failed processing unit 110 can thereby perform the rerun process, and it is thus possible to improve the efficiency of the processing in the whole system.

Note that, although an example in which the trace RAM 114 and the processing unit 110 are connected through a dedicated system bus is shown in FIG. 15, the configuration is not limited thereto, as long as the configuration can prevent overwrite by the data writing unit 112 when reading necessary information for rerun from the RAM during the rerun determination process. Thus, writing by the data writing unit 112 may be stopped by adding a signal that gives a notification about a rerun determination process between the processing unit 110 and the processing control unit 120. Further, in order for the data writing unit 112 to determine whether access from the processing unit 110 is access to the trace RAM 114 or not, the start/end address of the trace RAM 114 or the like may be stored in a storage area and compared with the access address of the processing unit 110, thereby determining whether access from the processing unit 110 is access to the trace RAM 114.

Further, although it is described that the start/end address of the trace RAM 114 area is stored, the configuration is not limited thereto as long as the area of the trace RAM 114 can be determined. For example, a system in which a setting can be rewritten from the processing unit 110 may be configured by placing a register for setting and connecting the processing control unit 120 with the processing unit 110 through the system bus 108 or a dedicated bus.

As described above, the semiconductor device 100 according to the first embodiment includes the processing control unit 120, the trace RAM 114 and the data writing unit 112. Thus, when an error occurs in the processing unit 110-1 (first processing unit), the processing unit 110-2 (second processing unit) can determine whether a continuation operation is possible or not as the whole system by using the trace information that is stored in the trace RAM 114-1 related to the processing unit 110-1. Therefore, the semiconductor device 100 according to the first embodiment can continue to perform the processing as the whole system even when an error occurs in one of a plurality of processing units 110. Further, the determination that a continuation operation is possible is made when the occurrence of an error in the processing unit 110-1 does not have any effect on the processing unit 110-2. It is thereby possible to more reliably make a determination as to whether a continuation operation is possible or not.

Further, in the first embodiment, the normal processing unit 110 continues to perform the processing that has been performed by itself when the address of the packet information with the error flag Fe is not within the range of the address of the storage area that can be used by the processing unit 110 itself, as in the above-described processing of S62 and S64 in FIG. 8. The normal processing unit 110 can thereby continue the processing which it has been performing without a malfunction.

Further, in the first embodiment, the normal processing unit 110 takes over the processing that has been performed by the failed processing unit 110 when the address of the packet information with the error flag Fe is not within the range of the addresses of the storage area that can be used by the failed processing unit 110, as in the above-described processing of S72 and S74 in FIG. 9. The normal processing unit 110 can thereby take over the processing which the failed processing unit 110 has been performing without a malfunction.

Although a technique is disclosed in related art which employs a mechanism that does not allow propagation of data output from a failed processing unit, there is a possibility in this technique that a delay may occur between the processing unit and a memory (a register such as a peripheral function) due to this mechanism. Further, there is a possibility that a normal processing unit may not be able to access the memory when this mechanism has failed. On the other hand, the semiconductor device 100 according to the first embodiment does not employ the above-mentioned mechanism, and it is thereby possible to prevent the occurrence of such a problem.

Second Embodiment

A second embodiment is described hereinafter. A semiconductor device according to the second embodiment is different from the semiconductor device 100 according to the first embodiment (FIG. 15) in that a rerun control function that can control a rerun process of a processing unit according to specified conditions is added.

Figure 17:
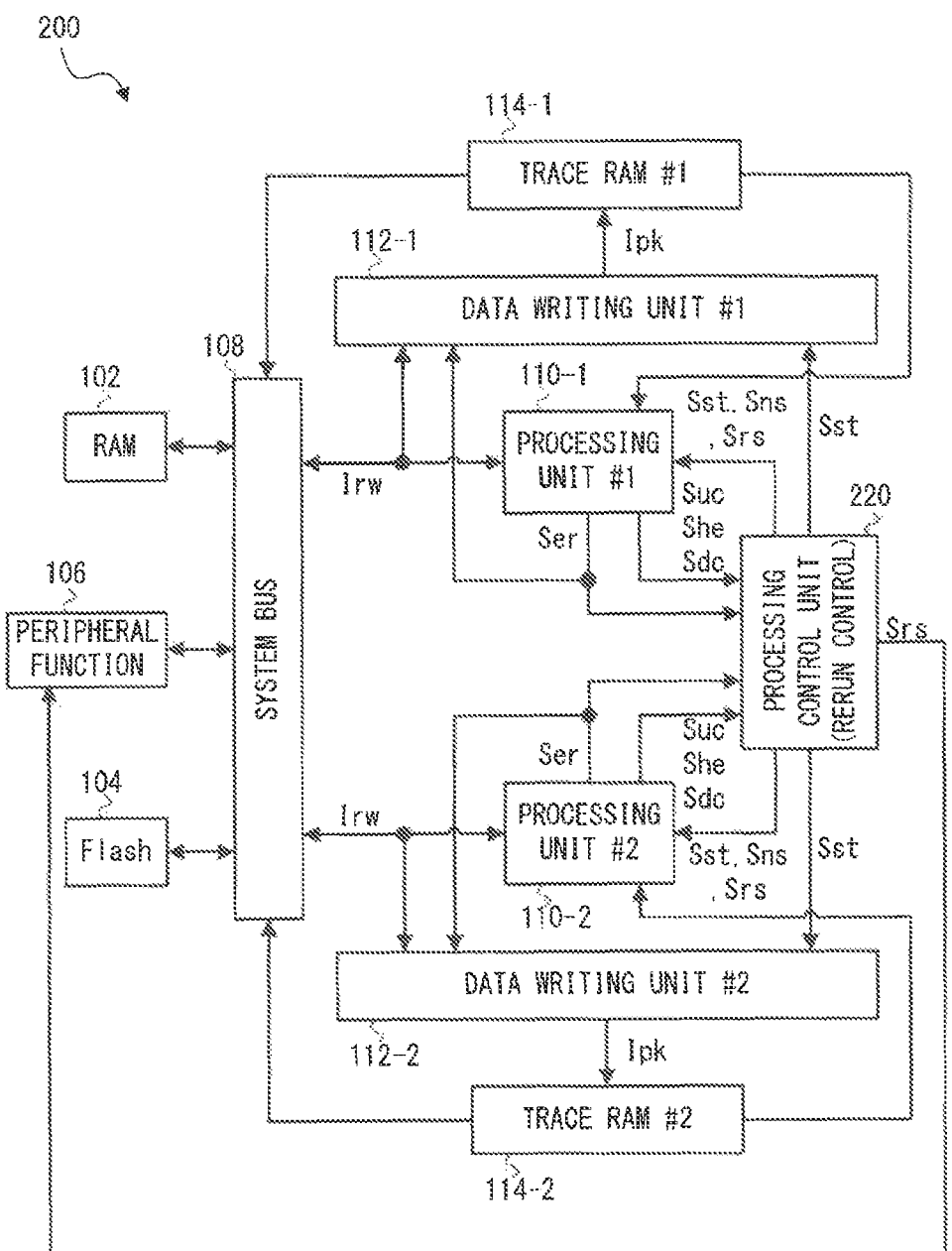
FIG. 17 is a view showing the configuration of a semiconductor device according to a second embodiment.

FIG. 17 is a view showing the configuration of a semiconductor device 200 according to the second embodiment. The semiconductor device 200 includes a RAM 102, a flash memory 104, a peripheral function 106, and a system bus 108. Further, the semiconductor device 200 includes a processing unit 110-1 (processing unit #1), a processing unit 110-2 (processing unit #2), a data writing unit 112-1 (data writing unit #1), a data writing unit 112-2 (data writing unit #2), a trace RAM 114-1 (trace RAM #1), and a trace RAM 114-2 (trace RAM #2). Further, the semiconductor device 200 includes a processing control unit 220. The elements other than the processing control unit 220 are substantially the same as those in the first embodiment, and the description thereof is omitted.

The processing control unit 220 according to the second embodiment has a rerun control function in addition to the function of the above-described processing control unit 120. The processing control unit 220 further has a mechanism that counts the number of errors communicated from each processing unit 110 for the rerun control function. Note that setting of the rerun control function can be stored as a fixed value by previously connecting the processing control unit 220 with the ground, power supply or the like or connecting it with a signal that is a logical fixed value. Note that a system in which setting can be changed from the processing unit 110 may be configured by connecting the processing control unit 220 in which a register for rerun control function setting with the processing unit 110 through a bus.

Figure 18:
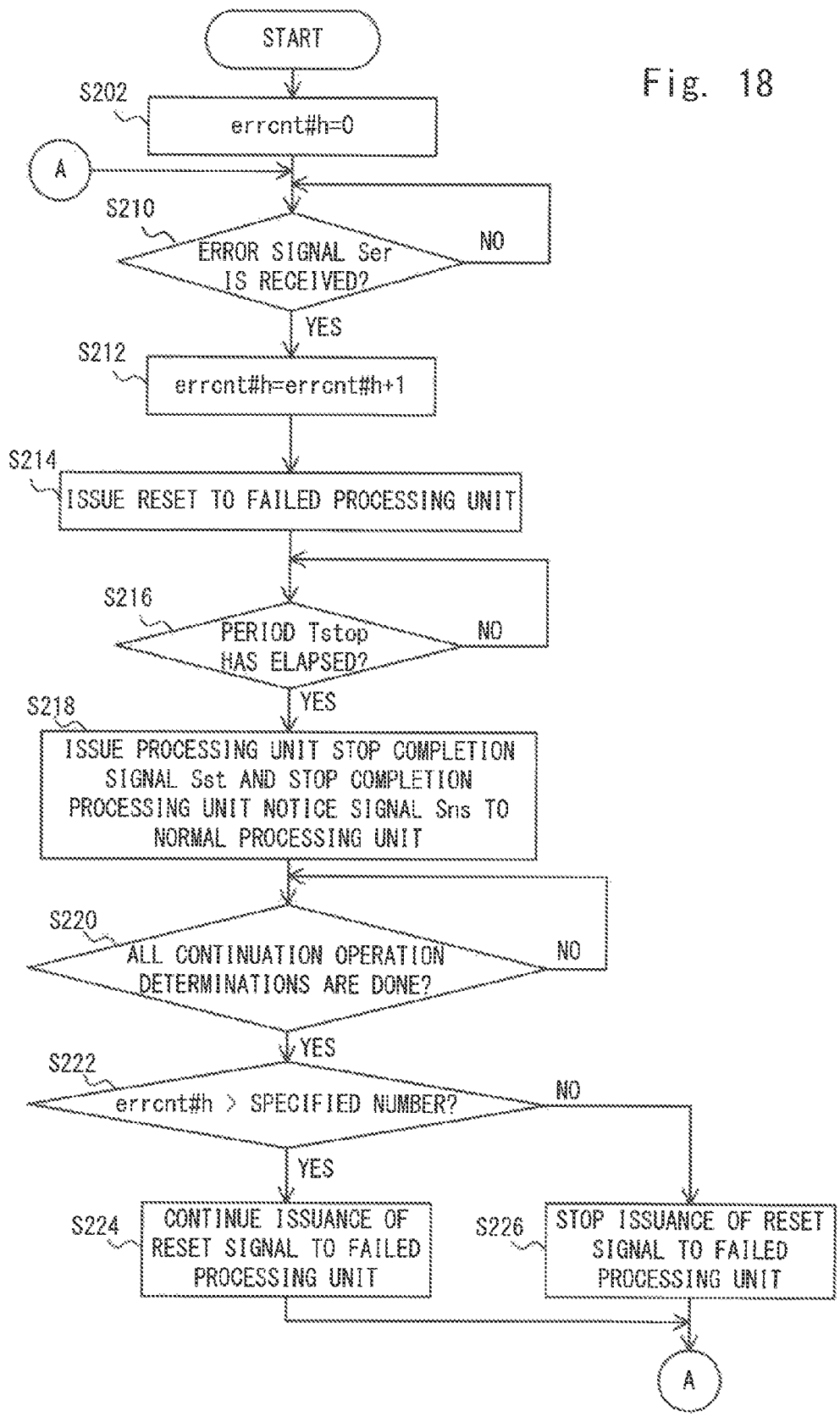
FIG. 18 is a flowchart showing a rerun control process performed by a processing control unit according to the second embodiment.

FIG. 18 is a flowchart showing a rerun control process that is performed by the processing control unit 220 according to the second embodiment. First, the processing control unit 220 performs an initialization sequence (Step S202). To be specific, the processing control unit 220 sets the error count errcnt # h to 0, where h indicates a numerical value corresponding to the processing unit 110. Thus, there are the number of unique variables indicating the error counts (i.e., number of times) of the respective processing units 110 same as the number of processing units 110. For example, the error count of the processing unit 110-1 is indicated by errcnt #1. Then, in the subsequent processing (S210 to S226), the rerun control process is performed. Note that the processing of S202 may be performed independently of the subsequent processing (S210 to S226).

When the processing control unit 220 receives the error signal Ser from the processing unit 110 (Yes in Step S210), it increments the error count errcnt # h by the count function (Step S212). For example, when an error notification is transmitted from the processing unit 110-1, the error count errcnt # h is incremented. Then, the processing control unit 220 issues the reset signal Srs to the failed processing unit 110, just like the processing of S42 in FIG. 7 (Step S214). After that, when the period Tstop has elapsed from the issuance of the reset signal Srs (Yes in Step S216), the processing control unit 220 issues the processing unit stop completion signal Sst and the stop completion processing unit notice signal Sns to the normal processing unit 110, just like the processing of S44 to S46 in FIG. 7 (Step S218).

The processing control unit 220 then determines whether the continuation operation determination is completely done or not by using the continuation operation determination completion signal Sdc from the normal processing unit 110 (Step S220). When it is determined that the continuation operation determination is completely done (Yes in S220), the processing control unit 220 determines whether the error count errcnt # h exceeds a specified number or not (S222). When the error count errcnt # h does not exceed a specified number (No in S222), the processing control unit 220 stops the issuance of the reset signal Srs to the failed processing unit 110 (Step S226). The process may then return to Step S210. Note that the failed processing unit 110 may perform the processing of S110 to S116 (rerun process) in FIG. 16 after that. On the other hand, when the error count errcnt # h exceeds a specified number (Yes in S222), the processing control unit 220 continues to issue the reset signal Srs to the failed processing unit 110 (Step S224), and the process returns to Step S210. In this case, the failed processing unit 110 does not rerun.

The timing to count the number of errors may be after the processing unit stop process is performed for the failed processing unit 110. In other words, the processing of S212 may be performed after the processing of S214. Further, the error count errcnt # h is stored, as a variable that is independent for each processing unit 110, in a storage device such as the RAM 102. Note that this variable can be distinguished by the details of an error. Further, a set value such as a specified number (upper limit) of the error count may be set in the processing control unit 220.

Although it is described that the error count errcnt # h is stored as a variable in a storage device such as the RAM 102, the configuration is not limited thereto. The processing control unit 220 may obtain the error count errcnt # h by counting the packet information that contains the processing unit stop flag Fs stored in the trace RAM 114. In this case, the trace RAM 114 and the processing control unit 220 may be connected through a bus.

Further, although it is described that the processing control unit 220 has the count function, the configuration is not limited thereto. The processing control unit 220 may count the number of errors in each processing unit 110 during a certain time period by using a timer or the like that is placed in the peripheral function 106. Further, the processing control unit 220 may obtain the frequency of errors by calculating the proportion of the number of packet information containing the processing unit stop flag Fs to the sum of the number of packet information containing the processing unit stop flag Fs and the number of (normal) packet information not containing the processing unit stop flag Fs, each stored in the trace RAM 114. Then, the processing control unit 220 may select whether to stop or continue the issuance of the reset signal to the failed processing unit 110 according to the frequency of errors. Further, the processing control unit 220 may determine whether or not to stop the issuance of the reset signal to the failed processing unit 110 by using both of the number of errors and the frequency of errors. In this case, the processing control unit 220 may make this determination by preferentially using one of the number of errors and the frequency of errors.

Figure 19:
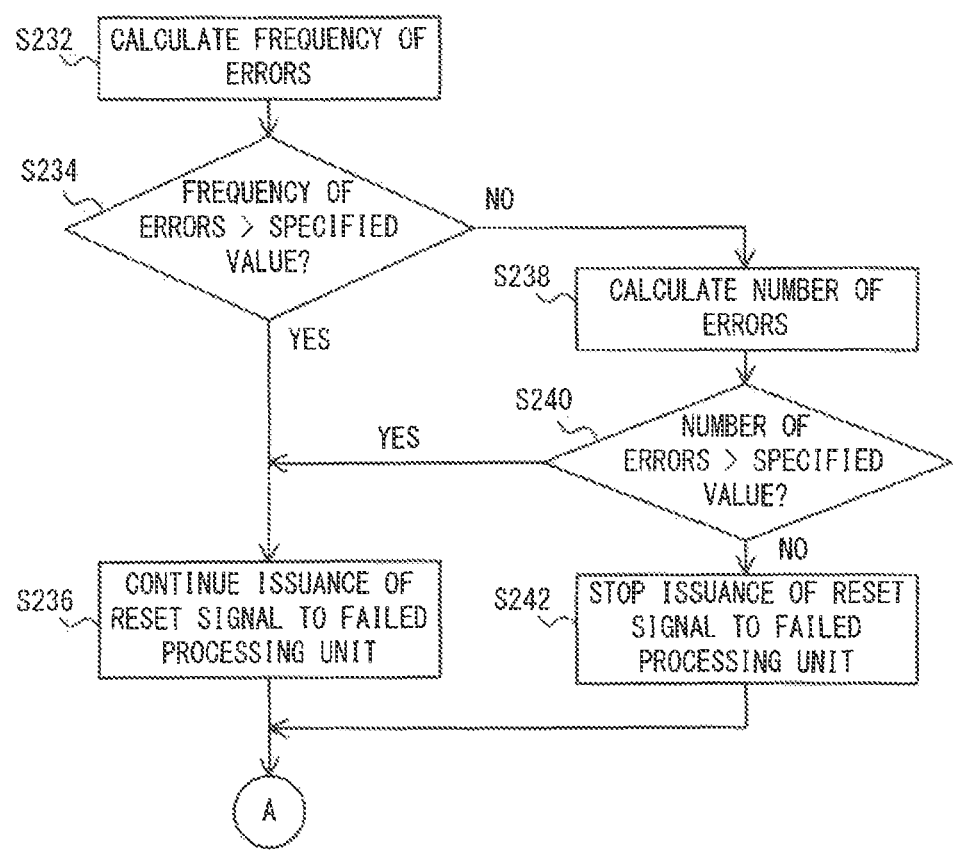
FIG. 19 is a flowchart showing a modified example of a rerun control process performed by the processing control unit according to the second embodiment.

FIG. 19 is a flowchart showing a modified example of a rerun control process that is performed by the processing control unit 220 according to the second embodiment. Note that the process of FIG. 19 can be performed in place of S222 to S226 in FIG. 18.

The processing control unit 220 calculates the frequency of errors in the above-described way (Step S232), and determines whether the calculated error frequency exceeds a specified value or not (Step S234). When the error frequency exceeds a specified value (Yes in Step S234), the processing control unit 220 continues to issue the reset signal Srs to the failed processing unit 110 (Step S236), and the process returns to Step S210 in FIG. 18. In this case, the failed processing unit 110 does not rerun.

On the other hand, when the error frequency does not exceed a specified value (No in Step S234), the processing control unit 220 calculates the number of errors (Step S238), and determines whether the error count exceeds a specified value or not (Step S240). When the error count exceeds a specified value (Yes in Step S240), the processing control unit 220 continues to issue the reset signal Srs to the failed processing unit 110 (Step S236). On the other, when the error count does not exceed a specified value (No in Step S240), the processing control unit 220 stops issuing the reset signal Srs to the failed processing unit 110 (Step S242), and the process returns to Step S210 in FIG. 18. The failed processing unit 110 can thereby perform the rerun process.

In this system configuration, even if the error frequency is equal or less than a specified value, the issuance of the reset signal Srs to the failed processing unit 110 is continued when the error count is more than a specified value, thereby stopping the failed processing unit 110. Note that the specified value can be set in the processing control unit 220. Further, the process shown in FIG. 19 is just an example, and it may be altered appropriately according to the system configuration.

When, for example, an error occurs in the processing unit 110, the semiconductor device 100 according to the first embodiment (the modified example 2 of the first embodiment) can stop the processing of this processing unit 110 by issuing a reset to the processing unit 110 where an error has occurred, and can rerun the processing unit 110 by canceling the issuance of the reset. However, in the case where a cause of a failure is not eliminated by the reset, there is a possibility that the reset operation may be performed again and again. On the other hand, the semiconductor device 200 according to the second embodiment can determine whether to stop or rerun the failed processing unit 110 according to the error count or the error frequency as described above. Thus, the semiconductor device 200 according to the second embodiment can prevent the repetition of the reset operation. In other words, the semiconductor device 200 according to the second embodiment can avoid the rerunning of the processing unit 110 that should not rerun.

Third Embodiment

A third embodiment is described hereinafter. A semiconductor device according to the third embodiment is different from the semiconductor devices according to the other embodiments in that it includes a decoding unit (determination unit). In the third embodiment, the decoding unit, not the normal processing unit, makes determination (continuation operation determination) about the presence or absence of an effect of processing that has performed by the failed processing unit.

Figure 20:
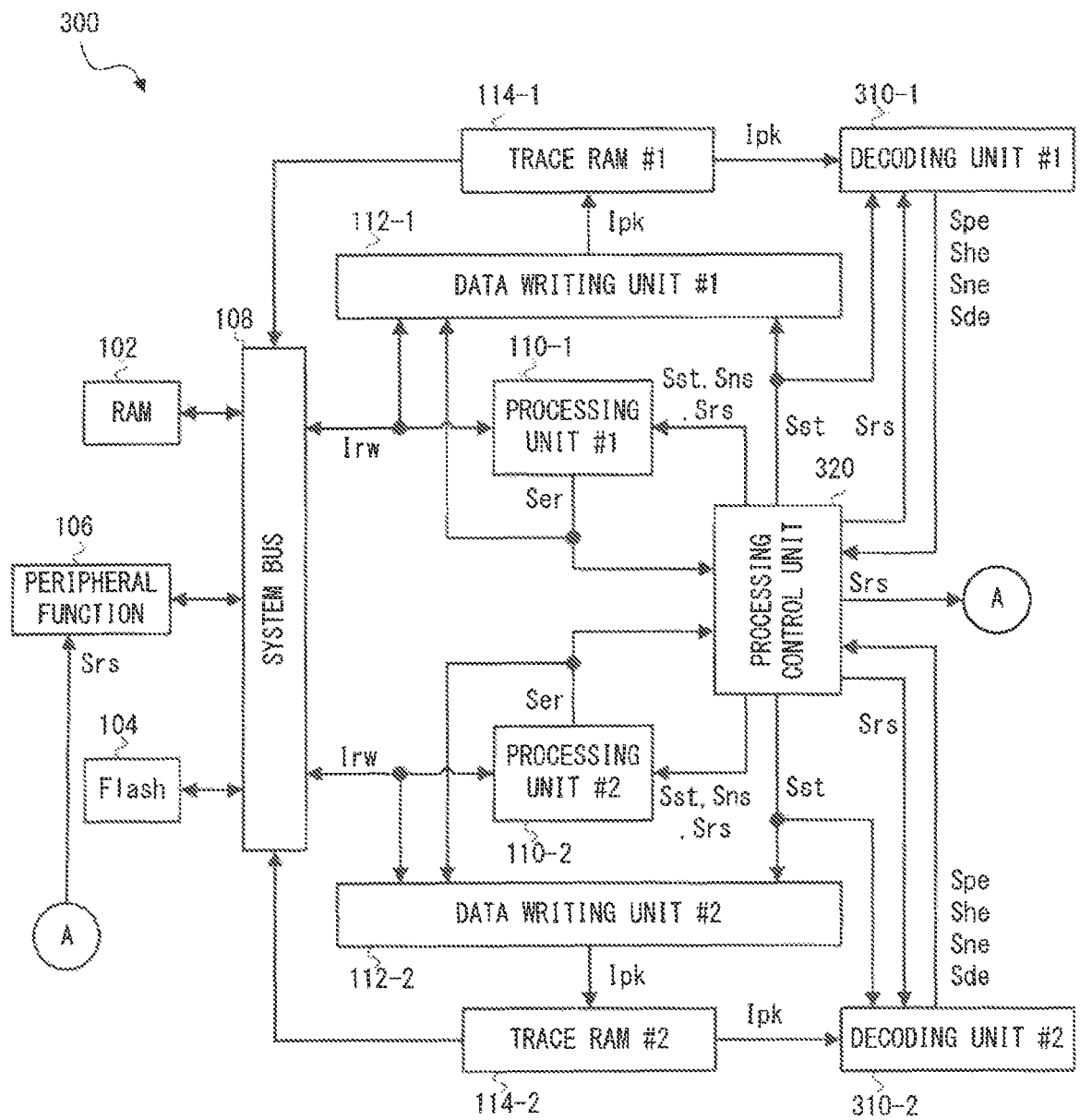
FIG. 20 is a view showing the configuration of a semiconductor device according to a third embodiment.

FIG. 20 is a view showing the configuration of a semiconductor device 300 according to the third embodiment. The semiconductor device 300 includes a RAM 102, a flash memory 104, a peripheral function 106, and a system bus 108. Further, the semiconductor device 300 includes a processing unit 110-1 (processing unit #1), a processing unit 110-2 (processing unit #2), a data writing unit 112-1 (data writing unit #1), a data writing unit 112-2 (data writing unit #2), a trace RAM 114-1 (trace RAM #1), and a trace RAM 114-2 (trace RAM #2). Further, the semiconductor device 300 includes a decoding unit 310-1, a decoding unit 310-2, and a processing control unit 320. The elements other than the decoding unit 310 and the processing control unit 320 are substantially the same as those in the other embodiments, and the description thereof is omitted. The decoding unit 310-1 and the decoding unit 310-2 are related to the processing unit 110-1 (processing unit #1) and the processing unit 110-2 (processing unit #2), respectively. In other words, the decoding unit 310 is placed corresponding to each of a plurality of processing units 110.

Just like the other embodiments, when the processing control unit 320 receives the error signal Ser from the failed processing unit 110, it issues the reset signal Srs to the failed processing unit 110, and thereby stops the operation of the failed processing unit 110. Then, when the period Tstop has elapsed from the issuance of the reset signal Srs, the processing control unit 320 issues the processing unit stop completion signal Sst to the decoding unit 310 corresponding to the failed processing unit 110, not to the normal processing unit 110.

The decoding unit 310 is connected to the trace RAM 114 through a bus. Further, the decoding unit 310 outputs a processing unit effect presence/absence signal Spe, a handover effect presence/absence signal She, an effect target notice signal Sne, and an effect determination completion signal Sde to the processing control unit 320. To the decoding unit 310, the packet information Ipk is input from the trace RAM 114. Further, the processing unit stop completion signal Sst and the reset signal Srs are input to the decoding unit 310 from the processing control unit 320.

Figure 21:
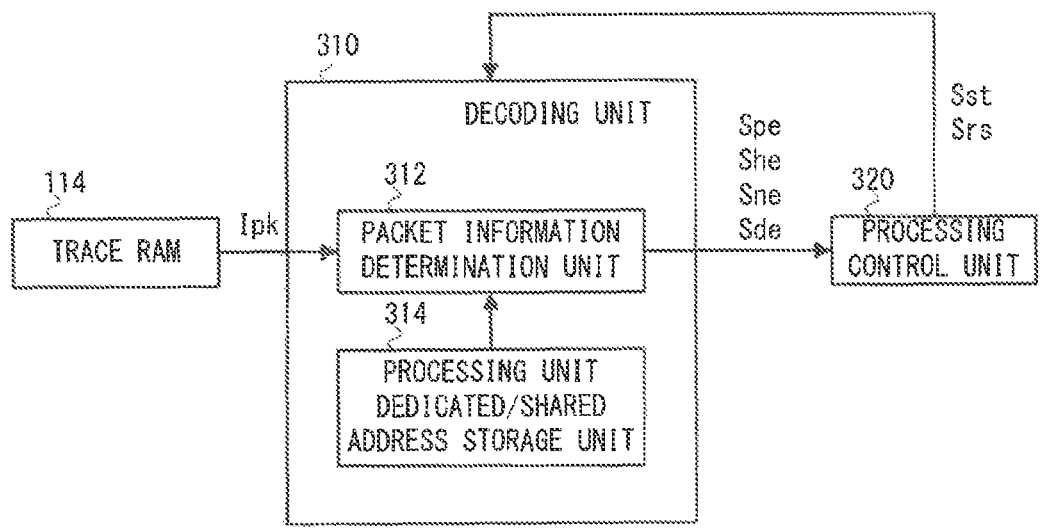
FIG. 21 is a view showing details of a decoding unit according to the third embodiment.

FIG. 21 is a view showing the details of the decoding unit 310 according to the third embodiment. The decoding unit 310 includes a packet information determination unit 312 and a processing unit dedicated/shared address storage unit 314. The processing unit dedicated/shared address storage unit 314 stores, as fixed values, the address information of the dedicated area and the shared area of each processing unit 110 as exemplified in FIG. 5. Setting of values in the processing unit dedicated/shared address storage unit 314 may be changeable by the processing unit 110 by adding a register and connecting the processing unit 110 and the decoding unit 310 through a bus. Although the packet information determination unit 312 is implemented by hardware, it may be implemented by software, with a processing unit added thereto. In this case, the same processing as that of the packet information determination unit 312 can be executed by placing a processing unit and a memory area that stores program codes and constants or the like used in a program, in place of the packet information determination unit 312.

The packet information determination unit 312 acquires the packet information Ipk from the trace RAM 114. The packet information determination unit 312 outputs the processing unit effect presence/absence signal Spe, the handover effect presence/absence signal She, the effect target notice signal Sne and the effect determination completion signal Sde to the processing control unit 320.

Figure 22:
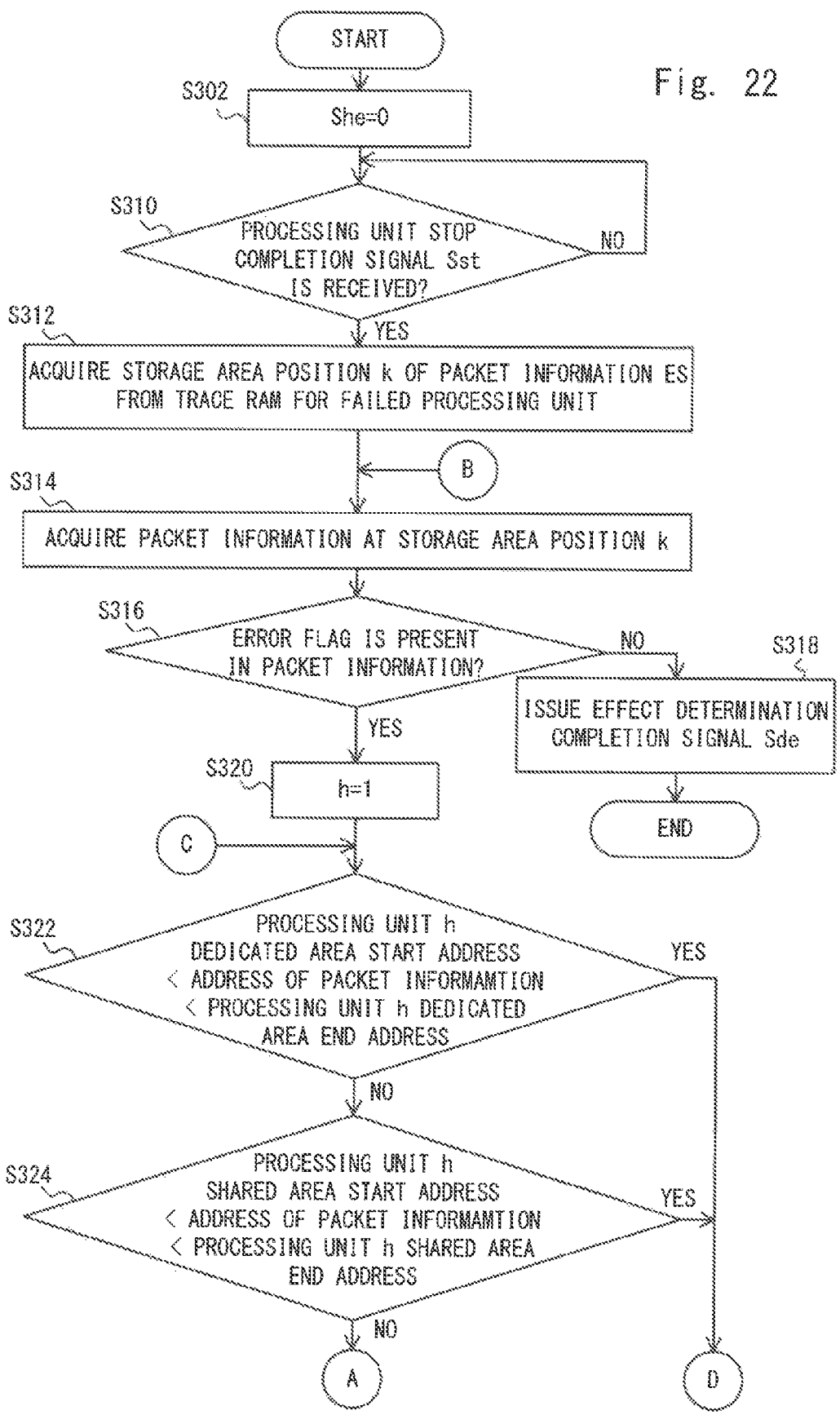
FIG. 22 is a flowchart showing a process of the decoding unit according to the third embodiment.
Figure 23:
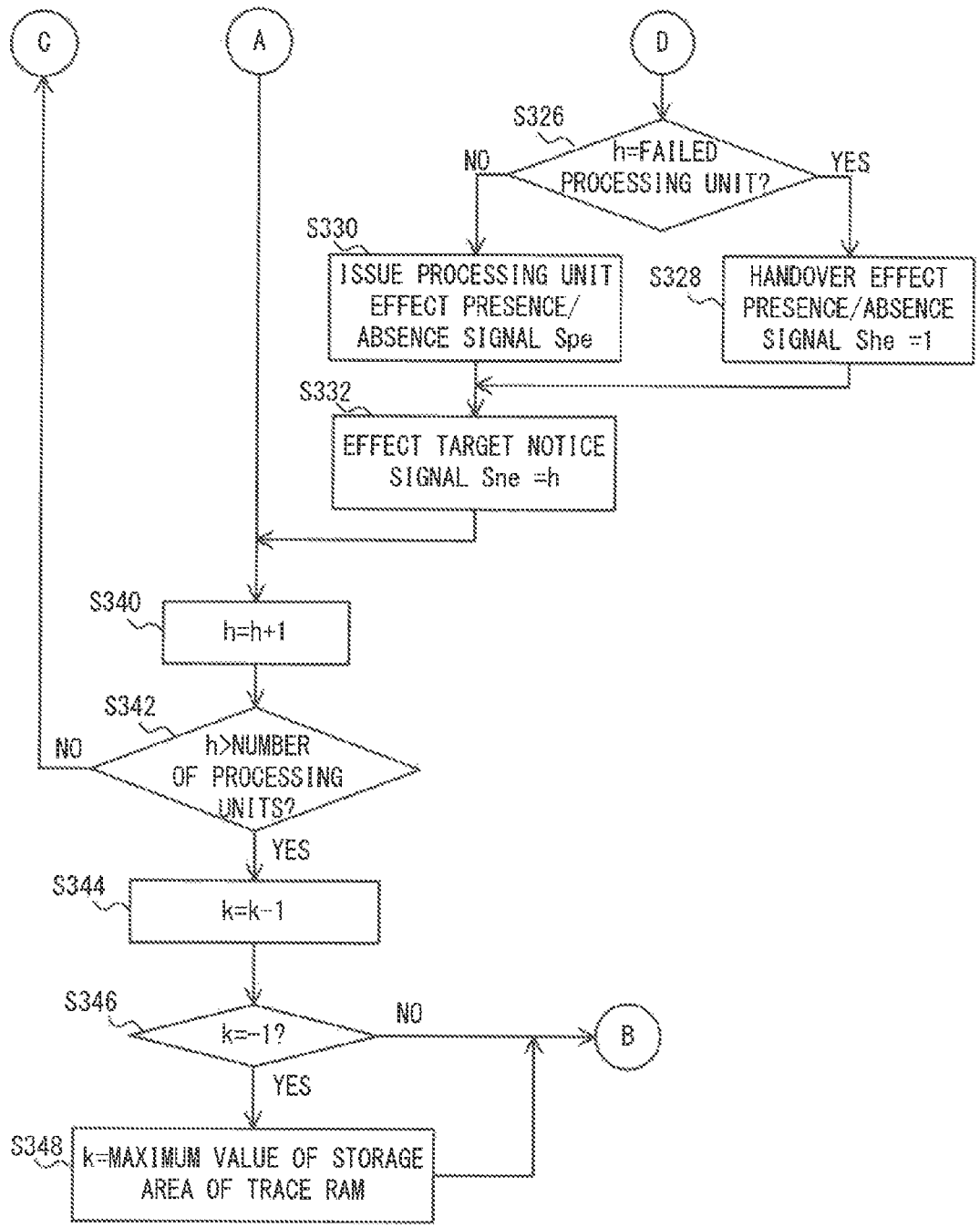
FIG. 23 is a flowchart showing a process of the decoding unit according to the third embodiment.

FIGS. 22 and 23 are flowcharts showing the process of the decoding unit 310 according to the third embodiment. Note that this process can be performed by the decoding unit 310 related to the failed processing unit 110. For example, when the processing unit 110-1 has failed, this process can be performed by the decoding unit 310-1. First, the packet information determination unit 312 initializes the handover effect presence/absence signal She (Step S302).

When the decoding unit 310 receives the processing unit stop completion signal Sst from the processing control unit 320 (Yes in Step S310), the packet information determination unit 312 acquires (retrieves) the storage area position k of the packet information ES from the trace RAM 114 corresponding to the failed processing unit 110 (Step S312). The retrieval may be performed in any manner as long as the storage area position k can be recognized, such as reading trace information of the trace RAM 114 or acquiring write position information from the data writing unit 112. Then, the packet information determination unit 312 acquires the packet information Ipk at the retrieved storage area position k (Step S314). Note that, although the packet information Ipk at the storage area position k is the packet information ES in the first processing in S314, the packet information Ipk at the storage area position k is the packet information E or the like in the second and subsequent processing in S314.

The packet information determination unit 312 determines whether the error flag Fe in the packet information Ipk at the storage area position k is 1, that is, whether there is the error flag Fe in the packet information Ipk at the storage area position k (Step S316). When there is no error flag Fe in the packet information Ipk at the storage area position k (No in S316), the packet information determination unit 312 issues the effect determination completion signal Sde in one pulse to the processing control unit 320 (Step S318), and the process ends.

When, on the other hand, there is the error flag Fe in the packet information Ipk at the storage area position k (Yes in S316), the packet information determination unit 312 initializes a variable h for specifying the processing unit 110 for which the presence or absence of an effect of processing by the failed processing unit 110 is determined (Step S320). Specifically, the packet information determination unit 312 sets h to 1. The packet information determination unit 312 determines whether the address of the packet information Ipk is between the processing unit dedicated area start address and the processing unit dedicated area end address of the processing unit # h by referring to the address information stored in the processing unit dedicated/shared address storage unit 314 (Step S322). In other words, the packet information determination unit 312 determines whether the trace information stored in the area of the trace RAM 114 is within the range of the start and end address information of the dedicated memory area of the processing unit # h by using the start and end address information of the dedicated memory area of the processing unit # h.

When the address of the packet information Ipk is within the range of the start and end address information of the dedicated memory area of the processing unit # h (Yes in Step S322), the process proceeds to Step S326. Otherwise (No in S322), the packet information determination unit 312 determines whether the address of the packet information Ipk is between the processing unit shared area start address and the processing unit shared area end address of the processing unit # h by referring to the address information stored in the processing unit dedicated/shared address storage unit 314 (Step S324). In other words, the packet information determination unit 312 determines whether the trace information stored in the area of the trace RAM 114 is within the range of the start and end address information of the shared memory area of the processing unit # h by using the start and end address information of the shared memory area of the processing unit # h.

When the address of the packet information Ipk is within the range of the start and end address information of the shared memory area of the processing unit # h (Yes in Step S324), the process proceeds to Step S326. Otherwise (No in S324), the process proceeds to Step S340.

In Step S326, the packet information determination unit 312 determines whether the processing unit # h is the failed processing unit 110 or not. This determination can be made by determining whether the processing unit 110 corresponding to the decoding unit 310 of itself (i.e., the failed processing unit 110) and the processing unit 110 indicated by the variable h match or not. Specifically, when the processing unit 110-2 (the processing unit #2) has failed and the decoding unit 310-2 performs the process shown in FIGS. 22 and 23, the packet information determination unit 312 in the decoding unit 310-2 determines whether the processing unit # h is the processing unit #2 or not, that is, whether h=2 or not. When the processing unit # h is the failed processing unit 110 (Yes in S326), the packet information determination unit 312 sets the handover effect presence/absence signal She to 1 (Step S328), and the process proceeds to Step S332. On the other hand, when the processing unit # h is not the failed processing unit 110 (No in S326), the packet information determination unit 312 issues the processing unit effect presence/absence signal Spe in one pulse (Step S330), and the process proceeds to Step S332. In Step S332, the packet information determination unit 312 sets the effect target notice signal Sne to h. The process then proceeds to S340, and it returns to the flow of the determination operation.

In Step S340, the packet information determination unit 312 increments the variable h. Then, the packet information determination unit 312 determines whether h exceeds the number of processing units 110 or not (Step S342). When h does not exceed the number of processing units 110 (No in Step S342), the process returns to Step S322 (the processing after S320). On the other hand, when h exceeds the number of processing units 110 (Yes in Step S342), determination on all of the processing units 110 is done for the packet information Ipk stored at the storage area position k.

Thus, the packet information determination unit 312 decrements the value of the storage area position k of the packet information Ipk (Step S344). The packet information determination unit 312 then determines whether the value of k is −1 or not (Step S346), and when not k=−1 (No in S346), the process returns to Step S314. On the other hand, when k=−1 (Yes in S346), the packet information determination unit 312 sets the value of k to the maximum value of the storage area of the trace RAM 114 (Step S348), and the process returns to Step S314. After that, the process flow is repeated until the error flag Fe ceases to exist in the packet information Ipk that is stored at the storage area position k (S316).

Note that the handover effect presence/absence signal She is initialized when the reset signal Srs is issued to the decoding unit 310. Further, although it is described that the packet information determination unit 312 outputs the effect target notice signal Sne, the configuration is not limited thereto as long as it can indicate the processing unit 110 on which an effect is caused. For example, a register for determination that is accessible from the processing control unit 320 may be placed in the decoding unit 310. Further, the number of processing unit stop completion signals Sst same as the number of processing units 110 excluding the processing unit 110 related to the decoding unit 310 of itself may be placed between the processing control unit 320 and the decoding unit 310. For example, the processing unit stop completion signals Sst for the processing unit 110 other than the processing unit 110-1 (for example, the processing unit 110-2) may be placed between the processing control unit 320 and the decoding unit 310-1.

Figure 24:
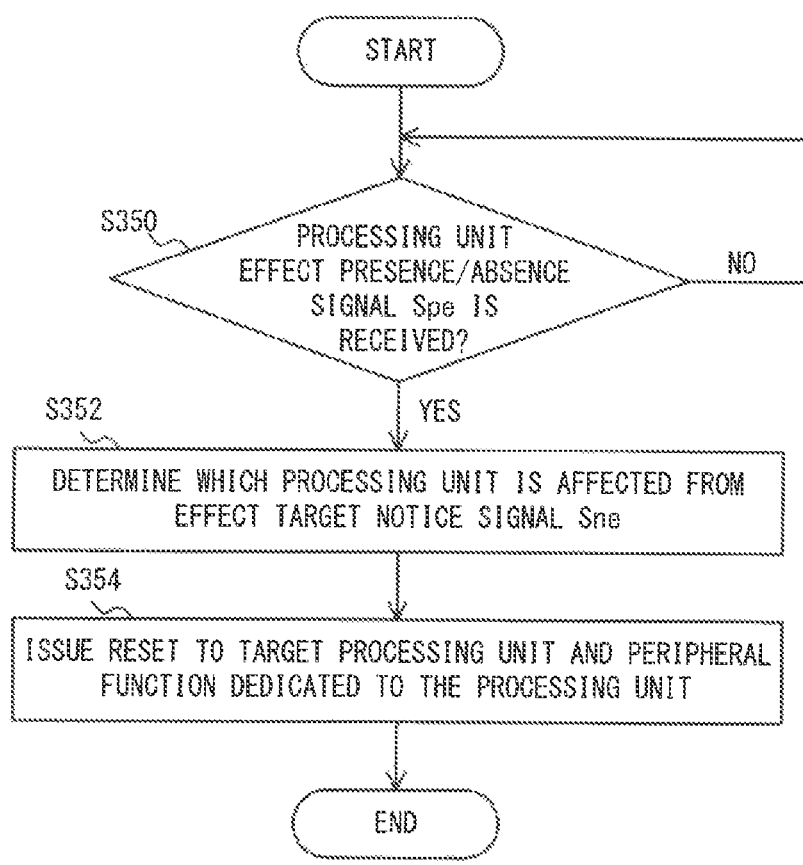
FIG. 24 is a flowchart showing a process when a processing unit effect presence/absence signal is issued which is performed by a processing control unit according to the third embodiment.

The processing of the processing control unit 320 is described hereinafter with reference to FIGS. 24 and 25. FIG. 24 is a flowchart showing a process when the processing unit effect presence/absence signal Spe is issued, which is performed by the processing control unit 320 according to the third embodiment. When the processing control unit 320 receives the processing unit effect presence/absence signal Spe (Yes in Step S350), it determines on which processing unit 110 the processing of the failed processing unit 110 has affected by using the effect target notice signal Sne (Step S352). Then, the processing control unit 320 issues an reset to the target processing unit 110 (the processing unit 110 that is affected by the processing of the failed processing unit 110) and the peripheral function 106 that is dedicated to this processing unit 110 (Step S354). The processing that may possibly be affected by the operation of the failed processing unit 110 is thereby prevented from being performed, and it is thus possible to prevent a malfunction of the normal processing unit 110 that is affected by the processing of the failed processing unit 110. Note that the range for issuing a reset can be modified as appropriate according to setting in the processing control unit 320.

Figure 25:
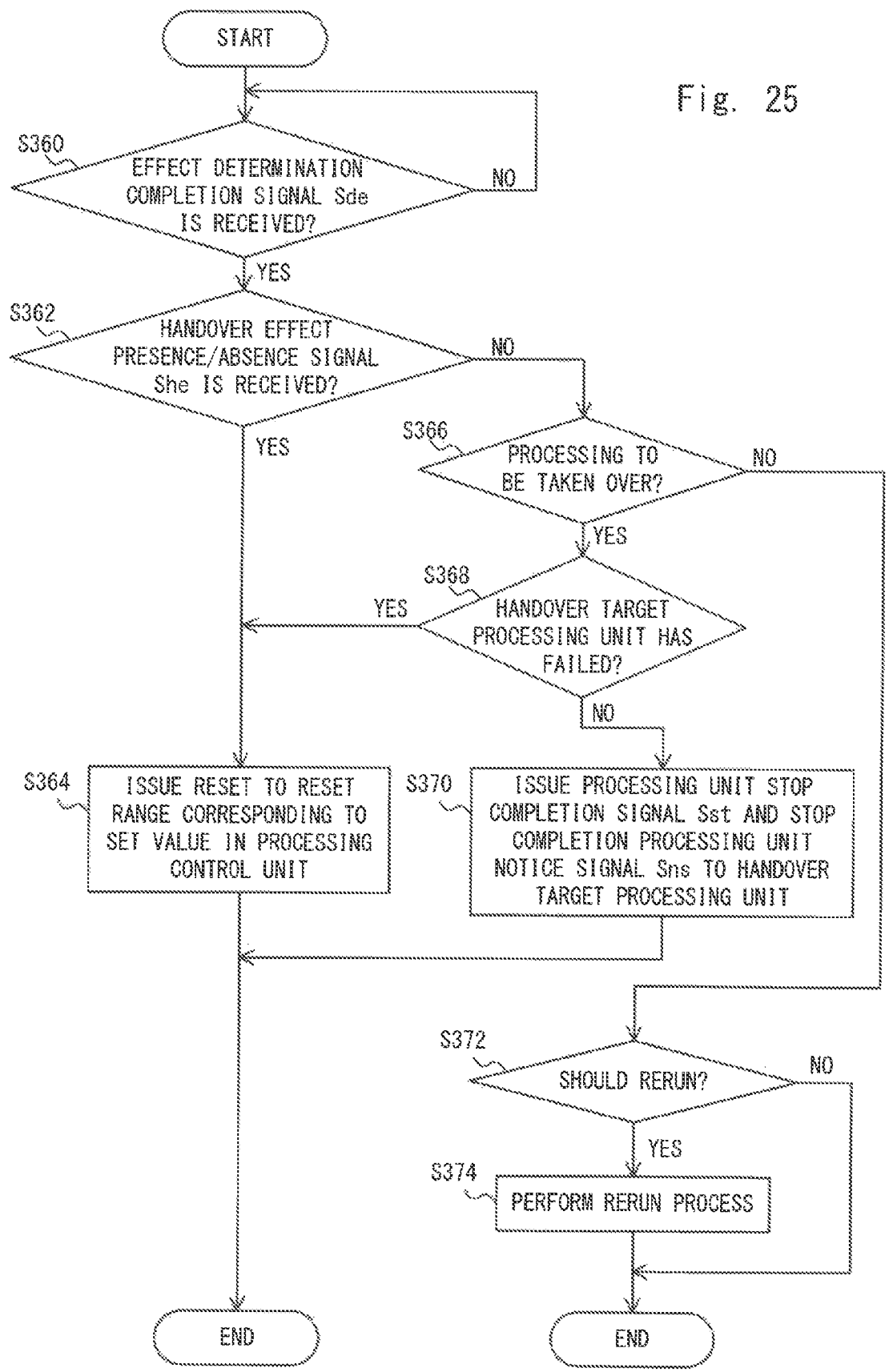
FIG. 25 is a flowchart showing a process when an effect determination completion signal is issued which is performed by the processing control unit according to the third embodiment.

FIG. 25 is a flowchart showing a process when the effect determination completion signal Sde is issued, which is performed by the processing control unit 320 according to the third embodiment. When the processing control unit 320 receives the effect determination completion signal Sde (Yes in Step S360), it determines whether the handover effect presence/absence signal She is received or not (Step S362). When the handover effect presence/absence signal She is received (Yes in S362), it is not possible to hand over (i.e., take over) the processing of the failed processing unit 110. Thus, the processing control unit 320 issues a reset to a reset range corresponding to a set value of the processing control unit 320 (Step S364). The processing that may possibly be affected by the operation of the failed processing unit 110 is thereby prevented from being performed, and it is thus possible to prevent a malfunction which would otherwise be caused due to handover of the processing that has been performed by the failed processing unit 110 to the normal processing unit 110. Note that the range for issuing a reset can be modified as appropriate according to a set value in the processing control unit 320.

On the other hand, when the handover effect presence/absence signal She is not received (No in S362), the processing control unit 320 determines whether the processing that has been performed by the failed processing unit 110 should be taken over (i.e., it is a target of the handover process) or not (Step S366). To be specific, like the processing of S70, the processing control unit 320 may determine whether the processing that has been performed by the failed processing unit 110 should be taken over or not according to the amount, importance or the like of the processing that has been performed by the failed processing unit 110. When it is determined that the processing that has been performed by the failed processing unit 110 should be taken over (Yes in Step S366), the processing control unit 320 determines whether the handover target processing unit 110 has failed or not (Step S368). To be specific, like the processing of S45a, the processing control unit 320 determines the handover target processing unit 110 based on handover target setting in the processing control unit 320. Then, the processing control unit 320 determines whether the error signal Ser is received from the handover target processing unit 110, and when the error signal Ser is received, it determines that the handover target processing unit 110 has failed. When it is determined that the handover target processing unit 110 has not failed (No in S368), the processing control unit 320 issues the processing unit stop completion signal Sst and the stop completion processing unit notice signal Sns to the handover target processing unit 110 (Step S370). The handover target processing unit 110 can thereby take over the processing that has been performed by the failed processing unit 110. On the other hand, when it is determined that the handover target processing unit 110 has failed (Yes in S368), the processing control unit 320 issues a reset to a reset range corresponding to a set value of the processing control unit 320 (Step S364). It is thereby possible to prevent a malfunction as the whole system even when the handover target processing unit 110 has failed. Further, by determining whether the handover target processing unit 110 has failed or not, it is possible to take over (i.e., hand over) the processing that has been performed by the failed processing unit 110 as the whole system without an error.

Further, the processing control unit 320 determines whether the failed processing unit 110 should rerun (i.e., it is a subject of the rerun process or not (Step S372). When the failed processing unit 110 should not rerun (No in Step S372), the process ends. On the other hand, when the failed processing unit 110 should rerun (Yes in Step S372), the processing control unit 320 performs the rerun process as shown in FIGS. 16, 18 and 19 (Step S374). Thus, in the case where the failed processing unit 110 should rerun, it is possible to allow the failed processing unit 110 to rerun if the failed processing unit 110 is able to rerun.

Modified Example 1 of Third Embodiment

The decoding unit 310 according to the third embodiment described above is connected to the trace RAM 114 that stores the packet information Ipk containing bus information (corresponding to the write/read information etc.) and error information (corresponding to the error signal Ser) of the processing unit 110. However, the configuration is not limited thereto as long as bus information and error information of the processing unit 110 can be input to the decoding unit 310. For example, the decoding unit 310 may acquire bus information and error information of each processing unit 110 in a sequential manner from the bus of each processing unit 110.

Figure 26:
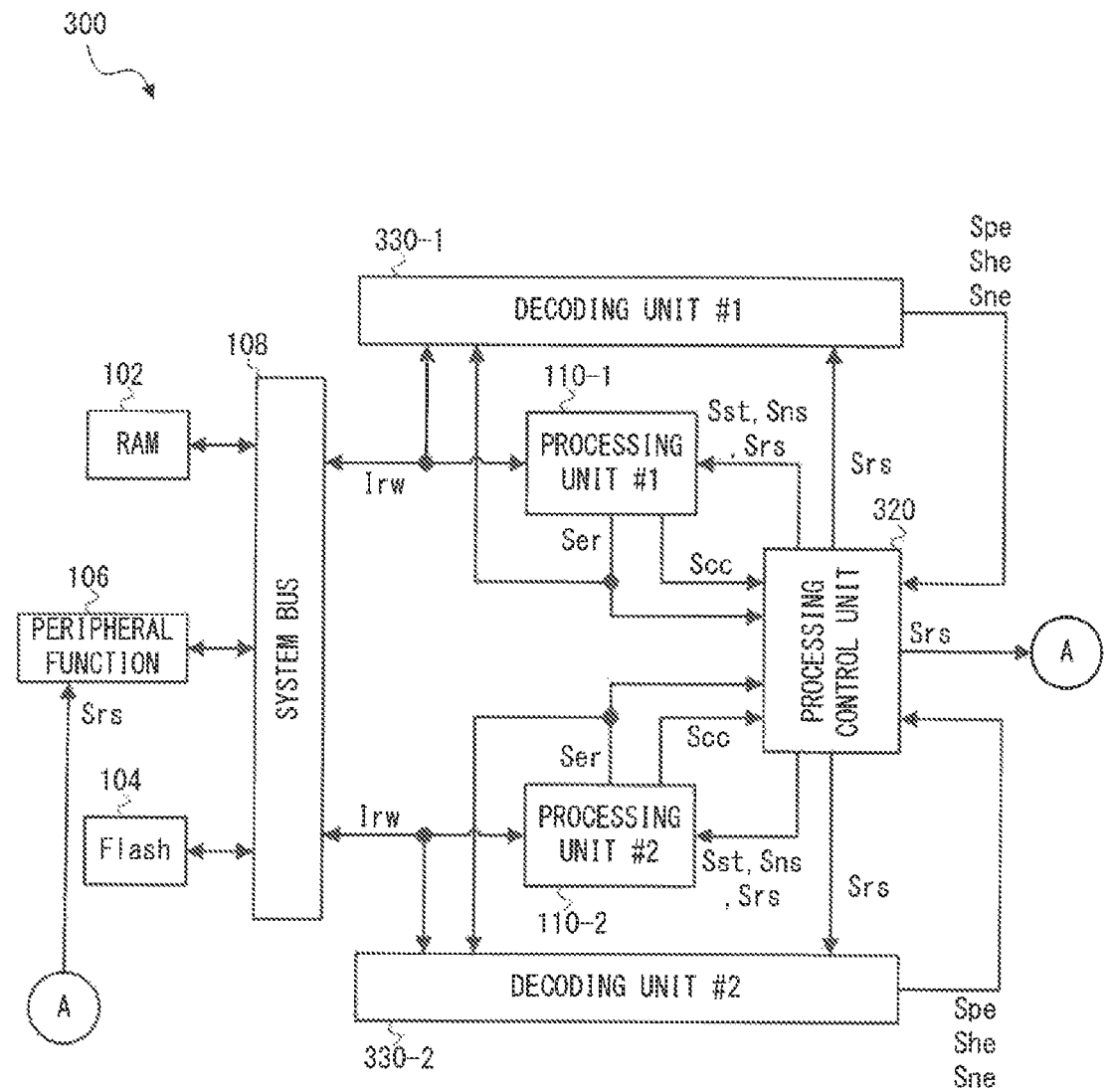
FIG. 26 is a view showing the configuration of a semiconductor device according to a modified example 1 of the third embodiment.

FIG. 26 is a view showing the configuration of the semiconductor device 300 according to a modified example 1 of the third embodiment. The semiconductor device 300 shown in FIG. 26 includes a decoding unit 330 (decoding unit 330-1 and decoding unit 330-2) in place of the data writing unit 112, the trace RAM 114 and the decoding unit 310. The decoding unit 330 may have the configuration of the decoding unit 310 as shown in FIG. 21.

The decoding unit 330 acquires bus information and error information (second information) of each processing unit 110 in a sequential manner from the bus of each processing unit 110, acquires packet information from those information and performs processing. Thus, the semiconductor device 300 according to the modified example 1 of the third embodiment does not need to store bus information and error information (packet information) of each processing unit 110, and there is no need for the data writing unit 112 and the trace RAM 114. Further, because the decoding unit 330 performs processing in a sequential manner, the processing unit stop completion signal Sst is not transmitted from the processing control unit 320 to the decoding unit 330. Further, because the decoding unit 330 performs processing in a sequential manner, the effect determination completion signal Sde is not transmitted from the decoding unit 330 to the processing control unit 320. On the other hand, when writing/reading is completed, the processing unit 110 notifies the processing control unit 320 of a write/read cycle completion signal Scc. The processing control unit 320 can thereby perform the process shown in FIG. 29, which is described later.

Figure 27:
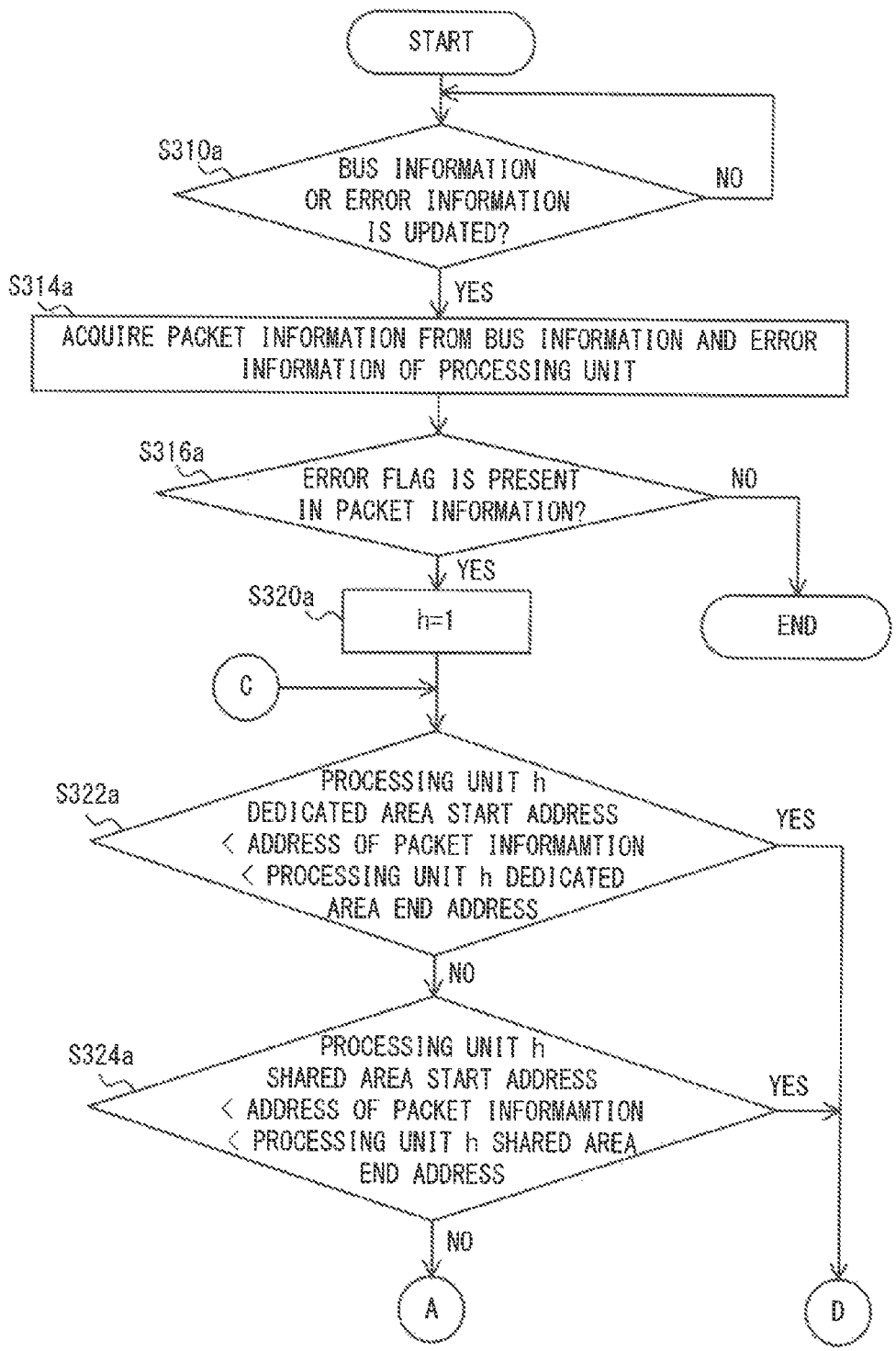
FIG. 27 is a flowchart showing a process of a decoding unit according to the modified example 1 of the third embodiment.
Figure 28:
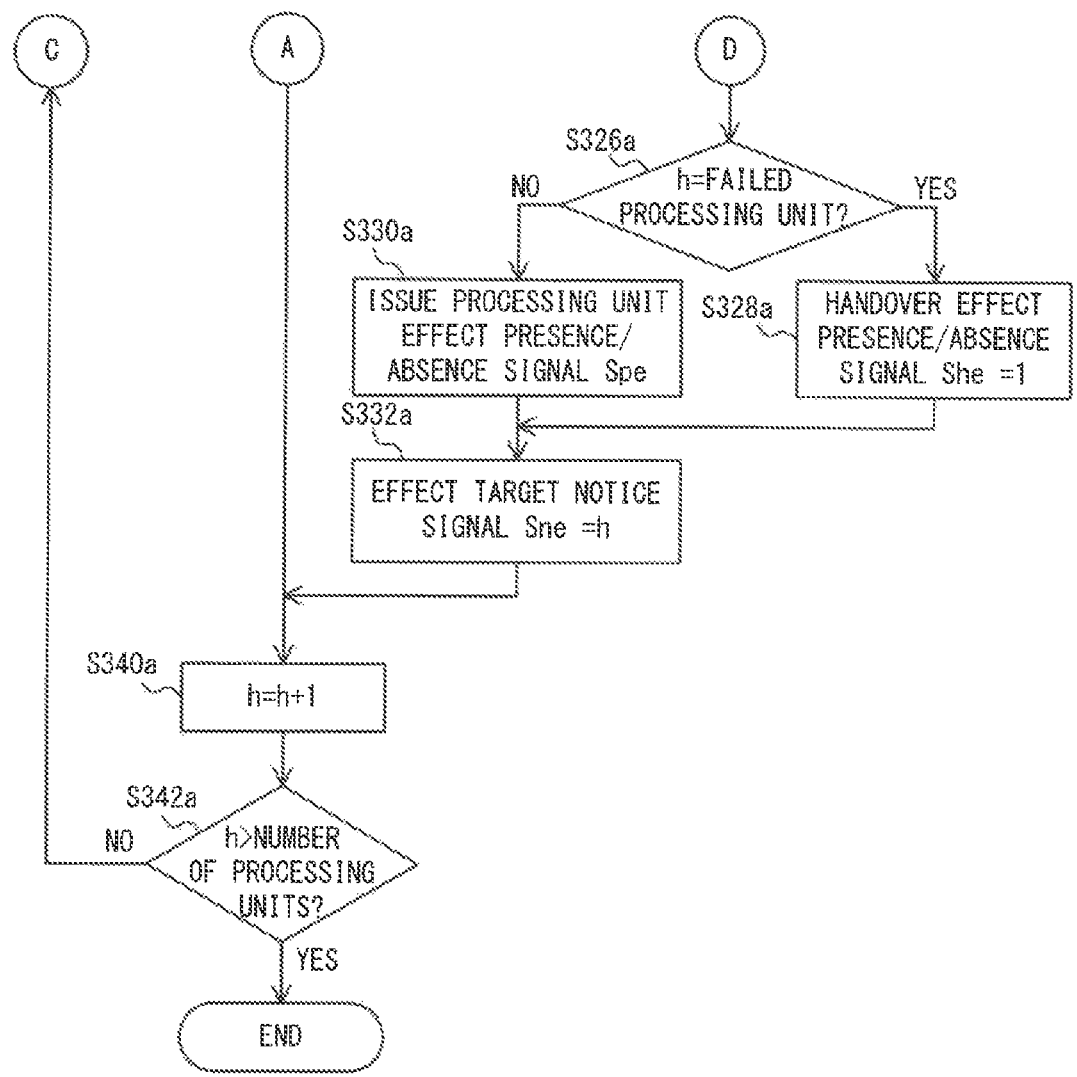
FIG. 28 is a flowchart showing a process of the decoding unit according to the modified example 1 of the third embodiment.

FIGS. 27 and 28 are flowcharts showing a process of the decoding unit 330 according to the modified example 1 of the third embodiment. As described above, this process is performed in a sequential manner by the decoding unit 330. The decoding unit 330 determines whether bus information or error information (packet information) of each processing unit 110 is updated or not (Step S310a), and when update is done (Yes in S310a), it acquires the packet information Ipk from the bus information and the error information (Step S314a). In this process, the decoding unit 330 may generate the packet information Ipk exemplified in FIG. 4 by using the bus information and the error information. Note that the packet information Ipk acquired in this step does not necessarily contain all of the information exemplified in FIG. 4.

The decoding unit 330 determines whether the error flag Fe in the packet information Ipk is 1, that is, whether there is the error flag Fe in the acquired packet information Ipk (Step S316a). When there is no error flag Fe in the packet information Ipk (No in S316a), the process ends.

When there is the error flag Fe in the packet information Ipk (Yes in S316a), the decoding unit 330 initializes a variable h for specifying the processing unit 110 for which the presence or absence of an effect of processing by the failed processing unit 110 is determined (Step S320a). The decoding unit 330 determines whether the address of the packet information Ipk is between the processing unit dedicated area start address and the processing unit dedicated area end address of the processing unit # h by referring to the address information shown in FIG. 5, just like S322 in FIG. 22 (Step S322a). In other words, the decoding unit 330 determines whether it is within the range of the start and end address information of the dedicated memory area.

When the address of the packet information Ipk is within the range of the start and end address information of the dedicated memory area of the processing unit # h (Yes in Step S322a), the process proceeds to Step S326a. Otherwise (No in S322a), the decoding unit 330 determines whether the address of the packet information Ipk is between the processing unit shared area start address and the processing unit shared area end address of the processing unit # h by referring to the address information shown in FIG. 5, just like S322 in FIG. 22 (Step S324a). In other words, the decoding unit 330 determines whether it is within the range of the start and end address information of the shared memory area of the processing unit # h.

When the address of the packet information Ipk is within the range of the start and end address information of the shared memory area of the processing unit # h (Yes in Step S324a), the process proceeds to Step S326a. Otherwise (No in S324a), the process proceeds to Step S340a.

In Step S326a, the decoding unit 330 determines whether the processing unit # h is the failed processing unit 110 or not. This determination can be made by determining whether the processing unit 110 corresponding to the decoding unit 330 of itself (i.e., the failed processing unit 110) and the processing unit 110 indicated by the variable h match or not. Specifically, when the processing unit 110-2 (the processing unit #2) has failed and the decoding unit 330-2 performs the process shown in FIGS. 27 and 28, the decoding unit 330-2 determines whether the processing unit # h is the processing unit #2 or not, that is, whether h=2 or not. When the processing unit # h is the failed processing unit 110 (Yes in S326a), the decoding unit 330 sets the handover effect presence/absence signal She to 1 (Step S328a), and the process proceeds to Step S332a. On the other hand, when the processing unit # h is not the failed processing unit 110 (No in S326a), the decoding unit 330 issues the processing unit effect presence/absence signal Spe in one pulse (Step S330a), and the process proceeds to Step S332a. In Step S332a, the decoding unit 330 sets the effect target notice signal Sne to h. The process then proceeds to S340a, and it returns to the flow of the determination operation. Note that the processing control unit 320 that has received the processing unit effect presence/absence signal Spe performs the process shown in FIG. 24. Further, the processing control unit 320 that has received the handover effect presence/absence signal She performs the process shown in FIG. 29.

In Step S340a, the decoding unit 330 increments the variable h. Then, the decoding unit 330 determines whether h exceeds the number of processing units 110 or not (Step S342a). When h does not exceed the number of processing units 110 (No in Step S342a), the process returns to Step S322a (the processing after S320a). On the other hand, when h exceeds the number of processing units 110 (Yes in Step S342a), the process ends. Note that the handover effect presence/absence signal She is initialized when issuing the reset signal Srs to the decoding unit 330.

Figure 29:
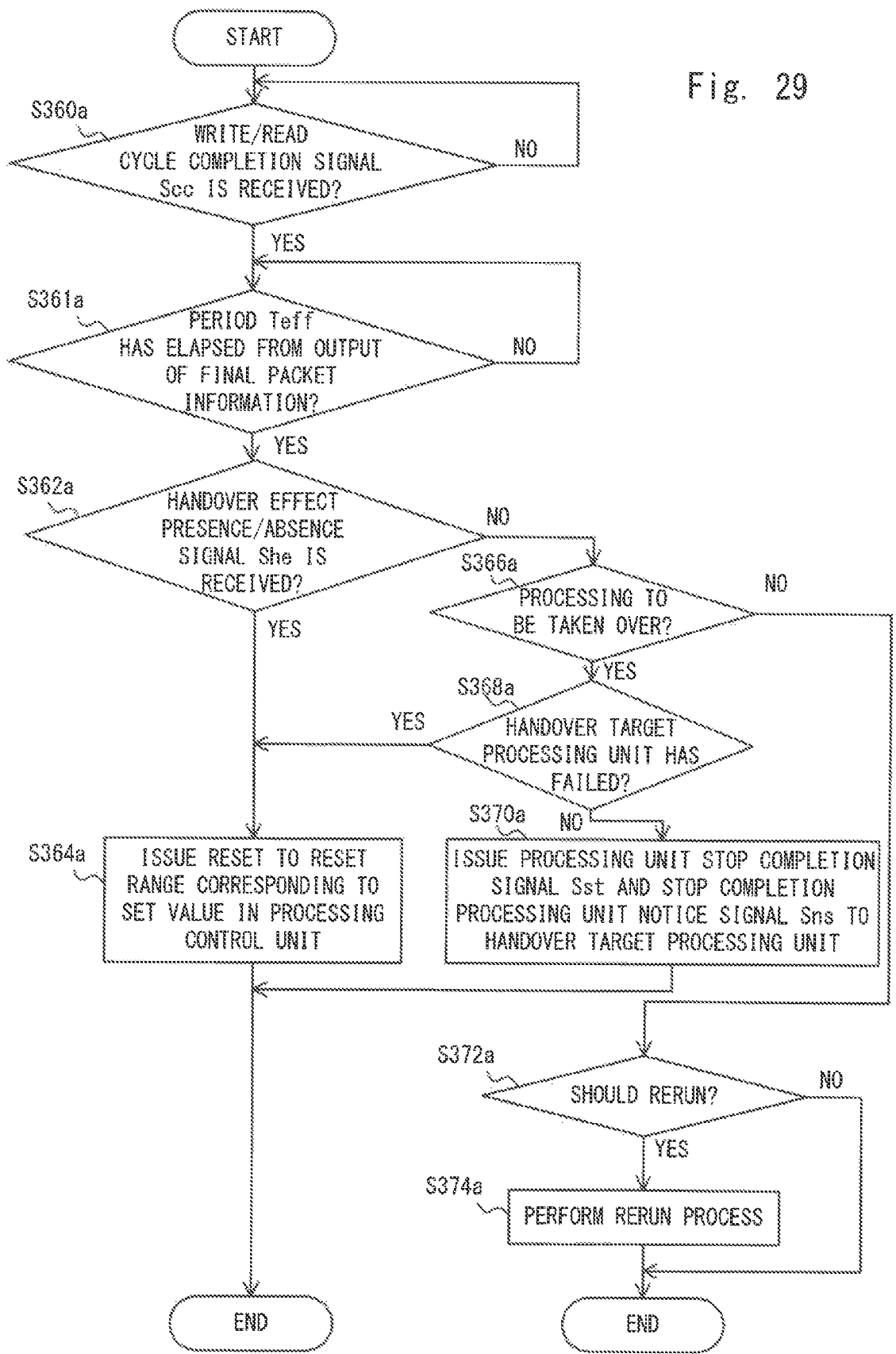
FIG. 29 is a flowchart showing a process of a processing control unit that has received a write/read cycle completion signal according to the modified example 1 of the third embodiment.

FIG. 29 is a flowchart showing a process of the processing control unit 320 that has received the write/read cycle completion signal Scc according to the modified example 1 of the third embodiment. When the processing control unit 320 receives the write/read cycle completion signal Scc (Yes in Step S360a), it determines whether a period Teff has elapsed or not after the output of final packet information (bus information etc.) from the failed processing unit 110 (Step S361a). In other words, the processing control unit 320 waits for the period Teff after the final packet information is output.

The period Teff is the maximum time needed for the decoding unit 330 to perform one packet information. Further, packet information that is processed following the notification of the write/read cycle completion signal Scc from the failed processing unit 110 to the processing control unit 320 is the final packet information. Thus, the processing control unit 320 measures the period Teff by starting a timer in the processing control unit 320, triggered by receiving the write/read cycle completion signal Scc. Note that, a predetermined value for measuring the period Teff is stored in the processing control unit 320. When this value and the count value of the timer become the same, the processing control unit 320 stops the counting of the timer and initializes the count value.

After the period Teff has elapsed (Yes in S361a), the processing control unit 320 determines whether the handover effect presence/absence signal She is received or not by the processing of S328a in FIG. 28 (Step S362a). When the handover effect presence/absence signal She is received (Yes in Step S362a), the processing control unit 320 issues a reset to a reset range corresponding to a set value in the processing control unit 320 (Step S364a). The processing that may possibly be affected by the operation of the failed processing unit 110 is thereby prevented from being performed, and it is thus possible to prevent a malfunction which would otherwise be caused due to handover of the processing that has been performed by the failed processing unit 110 to the normal processing unit 110. Note that the range for issuing a reset can be modified as appropriate according to a set value in the processing control unit 320. On the other hand, when the handover effect presence/absence signal She is not received (No in S362a), the processing control unit 320 determines whether the processing that has been performed by the failed processing unit 110 should be taken over (i.e., it is a target of the handover process) or not by the above-described method (Step S366a). When it is determined that the processing that has been performed by the failed processing unit 110 should be taken over (Yes in Step S366a), the processing control unit 320 determines whether the handover target processing unit 110 has failed or not (Step S368a). To be specific, like the processing of S45a, the processing control unit 320 determines the handover target processing unit 110 based on handover target setting in the processing control unit 320. Then, the processing control unit 320 determines whether the error signal Ser is received from the handover target processing unit 110, and when the error signal Ser is received, it determines that the handover target processing unit 110 has failed. When it is determined that the handover target processing unit 110 has not failed (No in S368a), the processing control unit 320 issues the processing unit stop completion signal Sst and the stop completion processing unit notice signal Sns to the handover target processing unit 110 (Step S370a). The handover target processing unit 110 can thereby take over the processing that has been performed by the failed processing unit 110. On the other hand, when it is determined that the handover target processing unit 110 has failed (Yes in S368a), the processing control unit 320 issues a reset to a reset range corresponding to a set value of the processing control unit 320 (Step S364a). It is thereby possible to prevent a malfunction as the whole system even when the handover target processing unit 110 has failed. Further, by determining whether the handover target processing unit 110 has failed or not, it is possible to take over (i.e., hand over) the processing that has been performed by the failed processing unit 110 as the whole system without an error.

Further, the processing control unit 320 determines whether the failed processing unit 110 should rerun (i.e., it is a subject of the rerun process or not (Step S372a). When the failed processing unit 110 should not rerun (No in Step S372a), the process ends. On the other hand, when the failed processing unit 110 should rerun (Yes in Step S372a), the processing control unit 320 performs the rerun process as shown in FIGS. 16, 18 and 19 (Step S374a). Thus, in the case where the failed processing unit 110 should rerun, it is possible to allow the failed processing unit 110 to rerun if the failed processing unit 110 is able to rerun.

Modified Example 2 of Third Embodiment

In the modified example 1 of the third embodiment described above, the decoding unit 330 performs the process shown in FIGS. 27 and 28 each time packet information (bus information and error information) is updated. However, in the case where the decoding unit 330 includes only one packet information determination unit 312, when the processing time exceeds the interval of updating the packet information, there is a possibility that the decoding unit 330 may not be able to perform processing even when the packet information is updated. To avoid this, the decoding unit 330 may include a plurality of packet information determination units 312.

Figure 30:
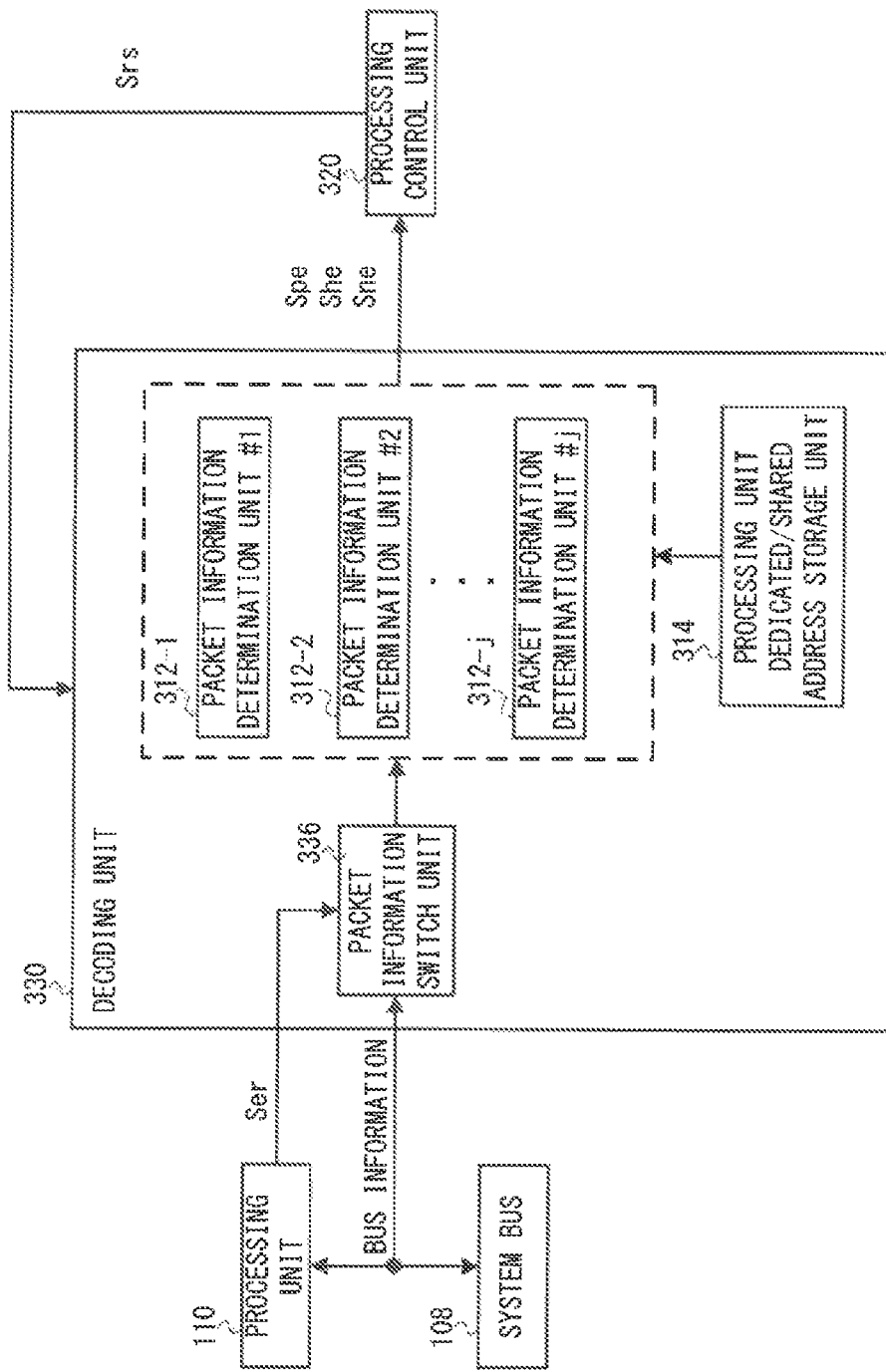
FIG. 30 is a view showing the configuration of a decoding unit according to a modified example 2 of the third embodiment.

FIG. 30 is a view showing the configuration of the decoding unit 330 according to a modified example 2 of the third embodiment. The decoding unit 330 according to the modified example 2 of the third embodiment includes a plurality of packet information determination units 312-1 to 312-j, a processing unit dedicated/shared address storage unit 314, and a packet information switch unit 336. Note that one processing unit dedicated/shared address storage unit 314 may be shared by the plurality of packet information determination units 312-1 to 312-j, or the processing unit dedicated/shared address storage unit 314 may be placed for each of the plurality of packet information determination units 312-1 to 312-j, separately.

j indicates the number of packet information determination units 312, which an integer of 2 or more. The packet information switch unit 336 switches the packet information determination units 312-1 to 312-j to process the updated packet information each time the packet information is updated. The packet information switch unit 336 acquires the bus information of each processing unit 110. Further, the error signal Ser (error information) is output from the processing unit 110 to the packet information switch unit 336.

Figure 31:
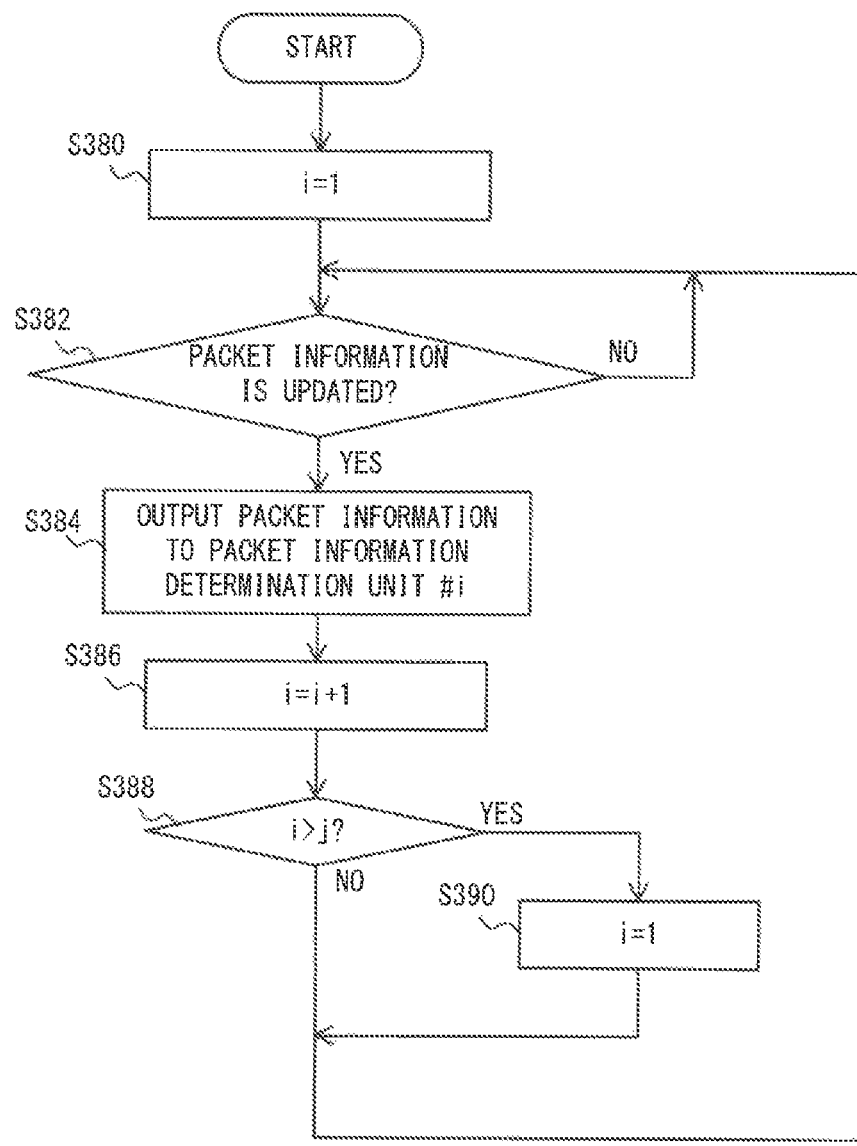
FIG. 31 is a flowchart showing a switch process of a packet information switch unit according to the modified example 2 of the third embodiment.

FIG. 31 is a flowchart showing a switch process of the packet information switch unit 336 according to the modified example 2 of the third embodiment. First, the packet information switch unit 336 initializes a variable i (Step S380). The variable i is an integer indicating any one of the packet information determination units 312-1 to 312-j to process the packet information. Thus, the variable i indicates to which packet information determination unit 312 the packet information switch unit 336 is to output the packet information. Then, the packet information determination unit 312-i processes the packet information.

The packet information switch unit 336 determines whether the packet information is updated or not (Step S382). When the packet information is updated (Yes in Step S382), the packet information switch unit 336 outputs the updated packet information to the packet information determination unit 312-i (packet information determination unit # i) (Step S384) and increments the variable i (Step S386).

Then, when i exceeds j (Yes in Step S388), the packet information switch unit 336 sets the variable i to 1 (Step S390). After that, the processing of S382 to S390 is repeated. In this manner, a plurality of packet information determination units 312 are placed, and the packet information switch unit 336 switches the packet information determination unit 312 to process the packet information, and it is thereby possible to process the updated packet information in a sequential manner even when the processing time of one packet information determination unit 312 exceeds the interval of updating the packet information.

As described above, in the semiconductor device 300 according to the third embodiment, the decoding unit makes continuation operation determination. This eliminates the need for the normal processing unit 110 to make the continuation operation determination. Thus, in the third embodiment, it is possible to reduce the continuation operation determination process of the normal processing unit 110, which is needed in the other embodiments.

Note that, although the decoding unit is placed corresponding to each processing unit 110 in the third embodiment described above, the configuration is not limited thereto. For example, one decoding unit may perform the above-described processing for a plurality of processing units 110. In other words, the number of decoding units does not necessarily the same as the number of processing units 110. However, if the decoding unit is placed corresponding to each processing unit 110, the processing of the decoding unit and the circuit configuration of the semiconductor device 300 are simplified.

Modified Example

It should be noted that the present invention is not restricted to the above-described embodiments, and various changes and modifications may be made without departing from the scope of the invention. For example, each of the above-described plurality of embodiments may be applicable to one another. For example, in the flowcharts according to the above-described embodiments, the order of process steps may be altered as appropriate. For example, the processing of S62 and the processing of S64 in FIG. 8 may be performed in the opposite order. Likewise, the processing of S72 and the processing of S74 in FIG. 9 may be performed in the opposite order. The same applies to the other process steps.

Further, although FIG. 5 shows an example in which each processing unit 110 includes one dedicated memory area and one shared memory area, the configuration is not limited thereto. Each processing unit 110 may include two or more dedicated memory areas and shared memory areas. In this case, each area may be added in the address information shown in FIG. 5. Further, there is a case where each memory area is not affected by bus access of the failed processing unit 110. In such a case, this memory area may be omitted in the address information shown in FIG. 5. Note that the case where a memory area is not affected is the case where this memory area is not overwritten with abnormal data by the failed processing unit 110 or the case where it is an area of the flash memory that does not have a mechanism like FIFO, a read clear function or the like. Further, although it is described that the address information shown in FIG. 5 contains the start address and the end address of each area, the address information may have any structure as long as each area can be distinguished from other areas.

Further, the above-described embodiments are also applicable to a bus master that is compatible with DMA (Direct Memory Access). In the case where the bus master is added, the data writing unit 112 and the trace RAM 114 may be added to a bus to which the bus master is connected.

Figure 32:
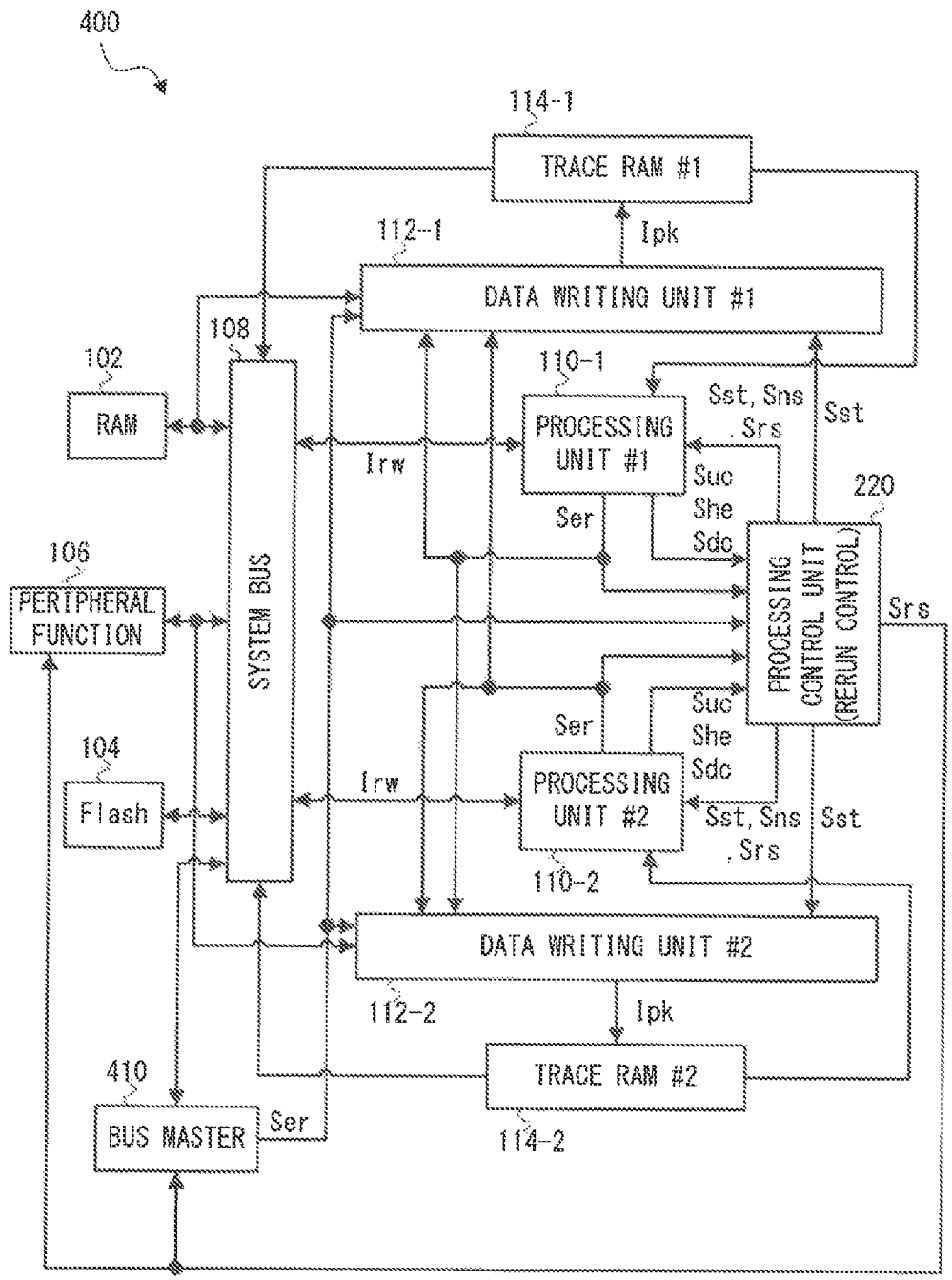
FIG. 32 is a view showing a semiconductor device that includes a bus master according to a modified example of this embodiment.

FIG. 32 is a view showing a semiconductor device 400 that includes a bus master 410 according to a modified example of this embodiment. Although FIG. 32 shows the semiconductor device 400 that is a modified example of the semiconductor device 200 according to the second embodiment shown in FIG. 17, the bus master may be added to a semiconductor device according to another embodiment.

The bus master 410 is connected to the system bus 108. The bus master 410 has the same function as that of the processing unit 110 or a function for at least performing a transfer operation compatible with the DMA. The bus master 410 at least includes an interface for receiving the reset signal Srs from the processing control unit 220 and outputting the error signal Ser of the bus master 410 itself to the processing control unit 220 and the data writing unit 112. Further, an input/output interface which is equivalent to the processing unit 110 can be added according to the function of the bus master 410. The bus master 410 controls the transfer of data between the RAM 102, the flash memory 104 and the peripheral function 106. In other words, the RAM 102, the flash memory 104 and the peripheral function 106 are slaves for the bus master 410. For example, the bus master 410 performs control to transfer data of a register in the peripheral function 106 to the RAM 102. In the above-described embodiments, the processing unit 110 makes the continuation operation determination on the trace RAM 114 of the failed processing unit 110. On the other hand, the modified example shown in FIG. 32 is different from the above-described embodiments in that the processing unit 110 or the bus master 410 makes the continuation operation determination on the trace RAM 114, which is the slave, having an area which it accesses.

Further, the example shown in FIG. 32 is different from the above-described embodiments in that the error signal Ser is input to each data writing unit 112 from all of the processing units 110 and the bus master 410. Because the error signal Ser from the processing unit 110 and the bus master 410 is input to the data writing unit 112, the data writing unit 112 generates the packet information Ipk that contains error information of the processing unit 110 or the bus master 410 after the occurrence of an error in the processing unit 110 or the bus master 410. In the modified example shown in FIG. 32, it is preferred that the data writing unit 112 writes only the packet information Ipk that contains error information to the trace RAM 114. The data writing unit 112-1 is connected to the RAM 102. Further, the data writing unit 112-2 is connected to the peripheral function 106. Thus, in the example of FIG. 32, the data writing unit 112 is placed on the slave side. The flash memory 104 is not overwritten with abnormal data by the failed processing unit 110, and it does not have a mechanism like FIFO, a read clear function and the like. Accordingly, the flash memory 104 is not affected by the failed processing unit 110, and it is thus not necessary to perform the continuation process or the like for packet information related to the flash memory 104, and there is no need to place the data writing unit 112 in the flash memory 104.

Note that the information write process and read process are performed in the bus master 410 as well, and it is possible to trace the write process and read process in the bus master 410 by placing the data writing unit 112 on the slave side. This eliminates the need to place the data writing unit 112 in the bus master 410. In this configuration, it is possible to suppress an increase in the number of data writing units 112 and trace RAMs 114 even when the number of bus masters 410 increases, thereby suppressing an increase in the scale of the circuit the semiconductor device 400.

Although the invention accomplished by the present inventor is specifically described using several embodiments in the foregoing, the present invention is not restricted to the above-described embodiments, and various changes and modifications may be made without departing from the scope of the invention.

The first, second and third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
   a plurality of processors;
   a controller configured to control operations of the processors;
   a memory; and
   a data writer configured to write, to the memory, first information related to processing of each of the plurality of processors, wherein
   when an error occurs in a first processor among the plurality of processors, the controller performs control to stop the first processor, a second processor among the plurality of processors maintains execution of first processing when an address related to processing corresponding to the first information is determined to be not within a range of addresses in a storage area used that can be used by the second processor, using the first information written to the memory when an error occurs in the first processor.

2. The semiconductor device according to claim 1, wherein, when the second processor determines that the second processor is unable to maintain execution of the first processing, the controller performs control to reset a specified range of operations in the semiconductor device.

3. The semiconductor device according to claim 1, wherein
   the second processor maintains execution of the first processing when the second processor determines that there is no effect of the error occurring in the first processor, using information stored in the memory.

4. The semiconductor device according to claim 1, wherein
   the first processing is processing performed by the second processor when the error occurs in the first processor.

5. The semiconductor device according to claim 1, wherein
   the first processing is processing performed by the first processor when the error occurs in the first processor, and
   the second processor maintains execution of the first processing when the address related to processing corresponding to the first information is determined to be not within a range of addresses in a storage area that can be used by the first processor, using the first information written to the memory when an error occurs in the first processor.

6. The semiconductor device according to claim 1, wherein
   when the error occurs in the first processor, the data writer writes, to the memory, the first information containing an error flag indicating occurrence of an error in the first processor, and
   a determination is made as to whether the second processor is able to maintains execution of the first processing by using the first information containing the error flag.

7. The semiconductor device according to claim 6, wherein
   when the first processor is stopped by the controller, the data writer writes, to the memory, the first information containing a stop flag indicating stop of the first processor, and
   a determination is made as to whether the second processor is able to maintain execution of the first processing for the first information containing the error flag in a range from the first information written at timing when the error occurs in the first processor to the first information containing the stop flag.

8. The semiconductor device according to claim 1, wherein
   after a determination is made as to whether the second processor is able to maintain execution of the first processing, the controller performs control to rerun the first processor.

9. The semiconductor device according to claim 8, wherein
   the controller controls whether to rerun the first processor according to at least one of a number of errors and a frequency of errors having occurred in the first processor.

10. The semiconductor device according to claim 1, further comprising:
    a decoder configured to determine whether the second processor is able to maintain execution of the first processing.

11. The semiconductor device according to claim 10, wherein
    the decoder is provided corresponding to each of the plurality of processors, and
    when the error occurs in the first processor, the decoder corresponding to the first processor determines whether the second processor is able to maintain execution of the first processing.

12. A semiconductor device comprising:
    a plurality of processors;
    a controller configured to control operations of the processors; and
    a decoder configured to acquire second information related to processing performed in a first processor among the plurality of processors from a bus connected to each of the plurality of processors, and performs processing for the second information, wherein
    when an error occurs in the first processor, the controller performs control to stop the first processor,
    when an error occurs in the first processor, the decoder determines whether a second processor among the plurality of processors is able to maintain execution of first processing based on the second information acquired from a bus connected to the first processor, and when the second processor is determined to be able to maintain execution of the first processing, the second processor maintains execution of the first processing.

13. The semiconductor device according to claim 12, wherein the decoder comprises:
a plurality of determination modules configured to determine whether the second processor is able to maintain execution of the first processing by using the second information; and
a switch configured to switch the plurality of determination modules to which the second information is to output, each time the second information is updated.

* * * * *